(12) United States Patent
O'Hara et al.

(10) Patent No.: US 10,890,923 B2
(45) Date of Patent: Jan. 12, 2021

(54) METHODS AND SYSTEMS FOR CHARGE CONTROL

(71) Applicant: Textron Innovations Inc., Providence, RI (US)

(72) Inventors: Luke Anthony O'Hara, Augusta, GA (US); Arthur James Harvey, Beech Island, SC (US)

(73) Assignee: Textron Innovations Inc., Providence, RI (US)

( * ) Notice: Subject to any disclaimer, the term of this patent is extended or adjusted under 35 U.S.C. 154(b) by 44 days.

(21) Appl. No.: 16/105,296

(22) Filed: Aug. 20, 2018

(65) Prior Publication Data

US 2019/0064849 A1 Feb. 28, 2019

Related U.S. Application Data

(60) Provisional application No. 62/549,241, filed on Aug. 23, 2017.

(51) Int. Cl.
*G05D 1/02* (2020.01)
*H02J 7/00* (2006.01)
(Continued)

(52) U.S. Cl.
CPC ............ *G05D 1/0297* (2013.01); *B60L 53/36* (2019.02); *B60L 58/12* (2019.02); *G05D 1/0027* (2013.01);
(Continued)

(58) Field of Classification Search
CPC ............... G05D 1/0297; G05D 1/0027; G05D 2201/0204; B60L 53/36; B60L 58/12;
(Continued)

(56) References Cited

U.S. PATENT DOCUMENTS 5,713,939 A * 2/1998 Nedungadi ........ A61N 1/37211
607/29
6,616,573 B2 9/2003 McLeod et al.
(Continued)

OTHER PUBLICATIONS

Garia, "Introducing the New Garia Golf", http://www.garia.com/news/introducing-the-new-garia-golf/, Sep. 15, 2016.

*Primary Examiner* — M Baye Diao
(74) *Attorney, Agent, or Firm* — BainwoodHuang

(57) ABSTRACT

A charge control system includes a lithium battery configured to provide lithium battery power to a set of electrical loads, a user signaling device, and control circuitry coupled with the lithium battery and the user signaling device. The control circuitry is operative to: (A) detect availability of charge from an external charger, (B) in response to detection of the availability of charge from the external charger and prior to controlling the external charger to adjust the amount of charge stored by the lithium battery, perform a set of pre-charging assessment operations, and (C) based on the set of pre-charging assessment operations, provide a user notification via the user signaling device, the user notification indicating whether the lithium battery is properly setup for charge adjustment. When the user signaling device generates the user notification, the user is informed that the utility vehicle is properly connected to the external charger.

20 Claims, 17 Drawing Sheets

(51) Int. Cl.
  *G05D 1/00* (2006.01)
  *B60L 53/36* (2019.01)
  *B60L 58/12* (2019.01)

(52) U.S. Cl.
  CPC .......... *H02J 7/0029* (2013.01); *H02J 7/0045* (2013.01); *H02J 7/0047* (2013.01); *B60L 2200/22* (2013.01); *B60L 2240/36* (2013.01); *G05D 2201/0204* (2013.01); *H02J 7/00045* (2020.01)

(58) Field of Classification Search
  CPC ............. B60L 2240/36; B60L 2200/22; H02J 7/0045; H02J 7/0029; H02J 7/0047; H02J 7/00045
  USPC ........................................................ 320/132
  See application file for complete search history.

(56) References Cited

U.S. PATENT DOCUMENTS

| | | | |
|---|---|---|---|
| 7,778,746 B2 | 8/2010 | McLeod et al. | |
| 7,952,381 B2* | 5/2011 | Kobayakawa | H03K 19/018585 326/27 |
| 8,692,509 B2* | 4/2014 | Shook | H02J 7/045 320/107 |
| 9,026,303 B1 | 5/2015 | Ferguson et al. | |
| 9,199,546 B2 | 12/2015 | King | |
| 9,225,183 B2 | 12/2015 | King | |
| 9,721,447 B2* | 8/2017 | Mese | H04M 1/72519 |
| 9,764,643 B2* | 9/2017 | Ono | B60L 3/04 |
| 9,847,658 B2* | 12/2017 | Kuhlmann | H02J 13/0003 |
| 9,908,461 B2 | 3/2018 | Gasper | |
| 10,110,053 B2 | 10/2018 | Brackx et al. | |
| 2009/0195217 A1* | 8/2009 | Choi | B60K 6/405 320/152 |
| 2013/0038274 A1* | 2/2013 | Forsythe | H02J 7/00041 320/107 |
| 2014/0225621 A1* | 8/2014 | Kimura | G01R 31/3842 324/426 |
| 2019/0319472 A1 | 10/2019 | Lebreux | |

* cited by examiner

METHODS AND SYSTEMS FOR CHARGE CONTROL

BACKGROUND

A conventional lithium-battery powered vehicle includes rechargeable lithium battery packs which discharge while energizing loads such as an electric motor of the vehicle. The lithium battery packs are then recharged from the electric grid.

To recharge the lithium battery packs of the vehicle, a human operator typically parks the vehicle next to a charging station, attaches a plug from the charging station to an electrical socket of the vehicle, and actuates a charge-enable switch that electrically connects the lithium battery packs to the electrical socket so that the lithium battery packs receive charge from the charging station through the electrical socket.

SUMMARY

It should be understood that there are deficiencies to the above-described conventional lithium-battery powered vehicle. Along these lines, the human operator may not have confidence that the equipment is correctly set up so that the charging station is now properly charging the conventional lithium-battery powered vehicle. For example, the human operator may not be sure that the plug from the charging station is properly attached to the electrical socket of the vehicle. As another example, the human operator may wonder whether the charge-enable switch is set to the correct position for charging. Accordingly, the human operator may spend additional time and effort unnecessarily reviewing and double checking the equipment. Moreover, if the human operator is tasked with charging multiple conventional lithium-battery powered vehicles (e.g., a fleet of golf cars), the extra time and effort placed on each vehicle may lead to excessive inefficiency and performance.

In contrast, improved techniques are directed to charge control that enhances the user experience. Along these lines, a human user is able to initiate pre-charging evaluation of a lithium battery by simply connecting an external charger to a utility vehicle. Shortly after the user connects the external charger to the utility vehicle and prior to the vehicle providing direction to the external charger to adjust the amount of charge stored by the lithium battery, the utility vehicle performs a set of pre-charging assessment operations to determine whether charge adjustment should commence. Upon a successful pre-charging assessment, the utility vehicle automatically provides a user notification indicating that the utility vehicle is properly setup for charge adjustment. Such notification may be in the form of one or more audio signals (e.g., one or more buzzes, beeps, bell tones, other distinctive noises, combinations thereof, etc.) and/or one or more video signals (e.g., one or more solid or blinking lights, output on one or more segmented displays, output on a graphical screen or monitor, combinations thereof, etc.). Additionally, such notification may be through one or more devices of the utility vehicle, through the external charger, through one or more separate devices (e.g., a smart phone, a tablet, a computerized workstation, a server, etc.), or combinations thereof, and so on.

For example, circuitry of the utility vehicle may output a "success" signal which causes one or more output devices selected by the user to provide the notification. Along these lines, the success signal may include a particular value in a predefine field, may be in a particular format, etc. indicating a successful outcome from the set of pre-charge assessment operations. Additionally or alternatively, the success signal may include a series of instructions that control the operation of the user device. In response, the user device provides the notification.

Accordingly, the user is able to proceed elsewhere (e.g., perform other useful work, etc.) with confidence that subsequent charge adjustment will proceed properly. Such operation thus eliminates the need for the user to double check or closely inspect charger connection, etc. Rather, the user may simply connect the charger, receive the notification shortly thereafter, and then proceed to another task (e.g., connect another charger to another vehicle), and so on. In some fleet management arrangements, a fleet of utility vehicles is managed concurrently to further inform the user (or a team of users) as to which utility vehicles of the fleet possess acceptable/unacceptable lithium battery health conditions, etc. before, during and/or after charge evaluation and/or adjustment.

One embodiment is directed to a charge control system that includes a lithium battery configured to provide lithium battery power to a set of electrical loads, a user signaling device, and control circuitry coupled with the lithium battery and the user signaling device. The control circuitry is operative to:
(A) detect availability of charge from an external charger,
(B) in response to detection of the availability of charge from the external charger and prior to controlling the external charger to adjust the amount of charge stored by the lithium battery, perform a set of pre-charging assessment operations, and
(C) based on the set of pre-charging assessment operations, provide a user notification via the user signaling device, the user notification indicating whether the lithium battery is properly setup for charge adjustment.

When the user signaling device generates the user notification, the user is informed that the utility vehicle is properly connected to the external charger.

In some arrangements, the lithium battery, the user signaling device, and the control circuitry are components of a utility vehicle. In certain arrangements, the control circuitry is further operative to, in response to a successful result from the set of pre-charging assessment operations, provide a control signal that adjusts the amount of charge stored by the utility vehicle's lithium battery.

In some arrangements, the control circuitry is further operative to detect an external charger connection event in which the external charger connects to a connector of the utility vehicle (e.g., a male plug, a female receptacle, etc.). In these arrangements, the external charger connection event indicates availability of charge from the external charger.

In some arrangements, the control circuitry, when providing the control signal that adjusts the amount of charge stored by the lithium battery, is operative to output a charger signal to the external charger through the connector. The charger signal causes the external charger to charge the lithium battery through the connector.

In some arrangements, the control circuitry, when performing the set of pre-charging assessment operations, is operative to test whether any of a plurality of battery management system (BMS) protection fault conditions exist, and generate a pre-charging assessment indication based on whether any of the plurality of BMS protection fault conditions exist. In some arrangements, testing whether any of the plurality of BMS protection fault conditions exist includes reading lithium battery temperature and voltage measurements from the lithium battery, and comparing the lithium battery temperature and voltage measurements to a set of predefined thresholds to determine whether any of the plurality of BMS protection fault conditions exist.

In some arrangements, the control circuitry, when performing the set of pre-charging assessment operations, is operative to test whether the lithium battery is to receive charge from the external charger, and generate a pre-charging assessment indication based on whether the lithium battery is to receive charge from the external charger. In some arrangements, testing whether the lithium battery is to receive charge from the external charger includes ascertaining a current amount of charge stored by the lithium battery, and comparing the current amount of charge to a predefined target charge range to determine whether the lithium battery is to receive charge from the external charger.

In some arrangements, the control circuitry, when performing the set of pre-charging assessment operations, is operative to test whether the external charger is operative to provide a predefined voltage to charge the lithium battery, and generate a pre-charging assessment indication based on whether the external charger is operative to provide the predefined voltage to charge the lithium battery. In some arrangements, testing whether the external charger is operative to provide the predefined voltage to charge the lithium battery includes measuring a current supply voltage provided by the external charger, and comparing the current supply voltage to a predefined supply voltage threshold to determine whether the external charger is currently operative to provide the predefined voltage to charge the lithium battery.

In some arrangements, the control circuitry, when performing the set of pre-charging assessment operations, is operative to:
(i) test whether any of a plurality of battery management system (BMS) protection fault conditions exist,
(ii) test whether the lithium battery is to receive charge from the external charger,
(iii) test whether the external charger is operative to provide a predefined voltage to charge the lithium battery, and
(iv) generate a pre-charging assessment indication based on (a) whether any of the plurality of BMS protection fault conditions exist, (b) whether the lithium battery is to receive charge from the external charger, and (c) whether the external charger is currently operative to provide the predefined voltage to charge the lithium battery.

Another embodiment is directed to a utility vehicle which includes a utility vehicle body, a set of electrical loads supported by the utility vehicle body, and a charge control system supported by the utility vehicle body and coupled with the set of electrical loads. The charge control system includes a lithium battery configured to provide lithium battery power to the set of electrical loads, a user signaling device, and control circuitry coupled with the lithium battery and the user signaling device. The control circuitry is operative to:
(A) detect availability of charge from an external charger,
(B) in response to detection of the availability of charge from the external charger and prior to controlling the external charger to adjust the amount of charge stored by the lithium battery, perform a set of pre-charging assessment operations, and
(C) based on the set of pre-charging assessment operations, provide a user notification via the user signaling device, the user notification indicating whether the lithium battery is properly setup for charge adjustment.

Another embodiment is directed to a charge control method which includes detecting availability of charge from an external charger and, in response to detection of the availability of charge from the external charger and prior to controlling the external charger to adjust the amount of charge stored by the lithium battery, performing a set of pre-charging assessment operations. The charge control method further includes providing, based on the set of pre-charging assessment operations, a user notification via the user signaling device, the user notification indicating whether the lithium battery is properly setup for charge adjustment.

Another embodiment is directed to a fleet management client device which includes a communications interface configured to communicate with a fleet management server apparatus, a utility vehicle interface configured to communicate with utility vehicle control circuitry that controls operation of a utility vehicle, and control circuitry coupled with the communications interface and the utility vehicle interface. The control circuitry is operative to:
(A) monitor a set of utility vehicle events through the utility vehicle interface and store a set of utility vehicle event entries in a buffer, the set of utility vehicle event entries identifying the set of utility vehicle events,
(B) establish a network connection between the fleet management client device and the fleet management server apparatus through the communications interface, and
(C) after the network connection between the fleet management client device and the fleet management server apparatus is established through the communications interface, convey the set of utility vehicle event entries from the buffer to the fleet management server apparatus via the network connection.

In some arrangements, the control circuitry, when storing the set of utility vehicle event entries in the buffer, is operative to record, as at least some of the set of utility vehicle event entries, a series of lithium battery conditions captured over time.

In some arrangements, the control circuitry, when detecting establishment of the network connection, is operative to automatically sense that the utility vehicle has entered a local wireless network location of the fleet management server apparatus. The set of utility vehicle event entries is communicated from the buffer to the fleet management server apparatus via the network connection in response to automatically sensing that the utility vehicle has entered the local wireless network location.

In some arrangements, the utility vehicle is an electric golf car constructed and arranged to transport a golfer among locations on a golf course. In some such arrangements in which the utility vehicle is an electric golf car, the fleet management client device further includes location identification circuitry coupled to the control circuitry, the location identification circuitry being configured to provide, to the control circuitry, a location signal that identifies a current geolocation of the electric golf car on the golf course. The fleet management client device may further include a touch screen coupled to the control circuitry. The touch screen is configured to receive golf course data that is based on the current geolocation of the electric golf car from the control circuitry and visually display the golf course data concurrently while the control circuitry records the series of lithium battery conditions captured over time.

Another embodiment is directed to a method of managing utility vehicle event entries which is performed in a fleet management client device of a utility vehicle. The method includes:
(A) monitoring a set of utility vehicle events through a utility vehicle interface of the fleet management client device of the utility vehicle and storing a set of utility vehicle event entries in a buffer, the set of utility vehicle event entries identifying the set of utility vehicle events;
(B) establishing a network connection between the fleet management client device and a fleet management server apparatus through a communications interface of the fleet management client device, and
(C) after the network connection between the fleet management client device and the fleet management server apparatus is established, conveying the set of utility vehicle event entries from the buffer to the fleet management server apparatus via the network connection.

Another embodiment is directed to a fleet management server apparatus which includes a communications interface configured to communicate with respective fleet management client devices of a fleet of utility vehicles, a utility vehicle database configured to store utility vehicle information from the fleet of utility vehicles, and control circuitry coupled with the communications interface and the utility vehicle database. The control circuitry is operative to:
(A) establish network connections between the fleet management server apparatus and the respective fleet management client devices of the fleet of utility vehicles through the communications interface,
(B) after the network connections between the fleet management server apparatus and the respective fleet management client devices are established, collect respective sets of utility vehicle event entries from the fleet of utility vehicles through the communications interface and store the respective sets of utility vehicle event entries in the utility vehicle database, and
(C) based on the respective sets of utility vehicle event entries stored in the utility vehicle database, perform a set of utility vehicle conditioning activities that conditions the fleet of utility vehicles.

In some arrangements, the fleet of utility vehicles is a plurality of electric golf cars. Each electric golf car is constructed and arranged to transport a golfer among locations on a golf course. In these arrangements, performing the set of utility vehicle conditioning activities based on the respective sets of utility vehicle event entries stored in the utility vehicle database includes performing, for each electric golf car of the plurality of electric golf cars, a lithium battery health assessment on a lithium battery of that electric golf car, and identifying a current set of health conditions of the lithium battery of that electric golf car.

Another embodiment is directed to method of managing a fleet of utility vehicles. The method includes:
(A) establishing network connections between the fleet management server apparatus and respective fleet management client devices of the fleet of utility vehicles through a communications interface,
(B) after the network connections are established, collecting respective sets of utility vehicle event entries from the fleet of utility vehicles through the communications interface and storing the respective sets of utility vehicle event entries in a utility vehicle database, and
(C) based on the respective sets of utility vehicle event entries stored in the utility vehicle database, performing a set of utility vehicle conditioning activities.

Other embodiments are directed to higher and lower level systems, assemblies, apparatus, processing circuits, etc. Some embodiments are directed to various processes, electronic components and circuitry which are involved in adjusting an amount of charge stored by a lithium battery of a utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to charge control that enhances the user experience. Along these lines, a human user is able to initiate pre-charging evaluation of a lithium battery by simply connecting an external charger to a utility vehicle. Shortly after the user connects the external charger to the utility vehicle and prior to the vehicle providing direction to the external charger to adjust the amount of charge stored by the lithium battery, the utility vehicle performs a set of pre-charging assessment operations to determine whether charge adjustment should commence. Upon a successful pre-charging assessment, the utility vehicle automatically provides a user notification indicating that the utility vehicle is properly setup for charge adjustment. Such notification may be in the form of one or more audio signals (e.g., one or more buzzes, beeps, bell tones, other distinctive noises, combinations thereof, etc.) and/or one or more video signals (e.g., one or more solid or blinking lights, output on one or more segmented displays, output on a graphical screen or monitor, combinations thereof, etc.). Additionally or alternatively, such notification may be through any of a variety of devices of the utility vehicle, through the external charger, through one or more separate devices (e.g., a smart phone, a tablet, a computerized workstation, a server, etc.), or combinations thereof, and so on. For example, circuitry of the utility vehicle may output a "success" signal which causes particular output devices selected by the user to provide the notification.

Thus, the user is able to proceed elsewhere (e.g., perform other useful work, etc.) with confidence that subsequent charge adjustment will proceed properly. Such operation eliminates the need for the user to double check or closely inspect charger connection, etc. Rather, the user may simply connect the charger, receive the notification shortly thereafter, and then proceed to another task (e.g., connect another charger to another vehicle), and so on. In some fleet management arrangements, a fleet of utility vehicles is managed concurrently to further inform the user (or a team of users) as to which utility vehicles of the fleet possess acceptable/unacceptable lithium battery health conditions, etc. before, during and/or after charge evaluation and/or adjustment.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
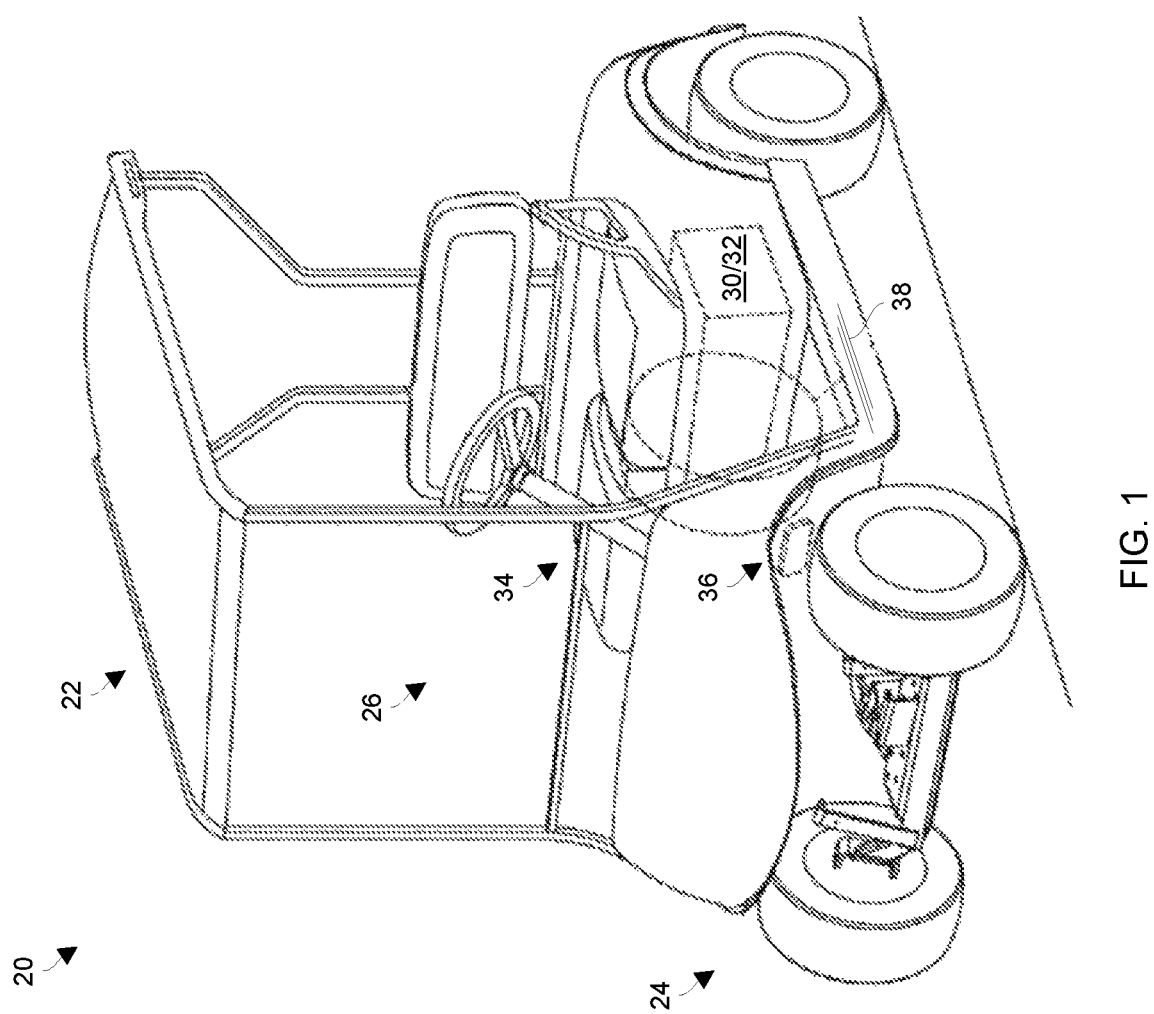
FIG. 1 is a perspective view of an example utility vehicle which controls electrical access to a lithium battery.

FIG. 1 shows an example utility vehicle 20 which controls electrical access to a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles. In embodiments, such as the example of FIG. 1, in which the utility vehicle 20 is a golf car, the golf car may include an operator seating area covered by a canopy supported by a plurality of struts. The golf car may further comprise a rear bag well area disposed rearward of the operator seating area and configured to carry one or more golf bags and/or other cargo. In some embodiments, the rear bag well area may support a rear facing seat for carrying additional passengers and/or a convertible rear seat kit configured to convert to a cargo deck for carrying cargo, such as E-Z-GO Rear Flip Seat Kit Item #750265PKG.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a lithium battery system 32, and additional components 34 such as a set of user controls 36 (e.g., a foot pedal, a keyed switch, a maintenance switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging. Additionally, in accordance with certain embodiments, the utility vehicle 20 is operative to generate a user notification to inform a user that a charger has been properly connected to the utility vehicle. Furthermore, in accordance with certain embodiments, the utility vehicle 20 is equipped with a fleet management client device to enable conveyance of operational information to a fleet management server apparatus for robust and reliable utility vehicle fleet management. Further details will now be provided with reference to FIGS. 2 and 3.

Figure 2:
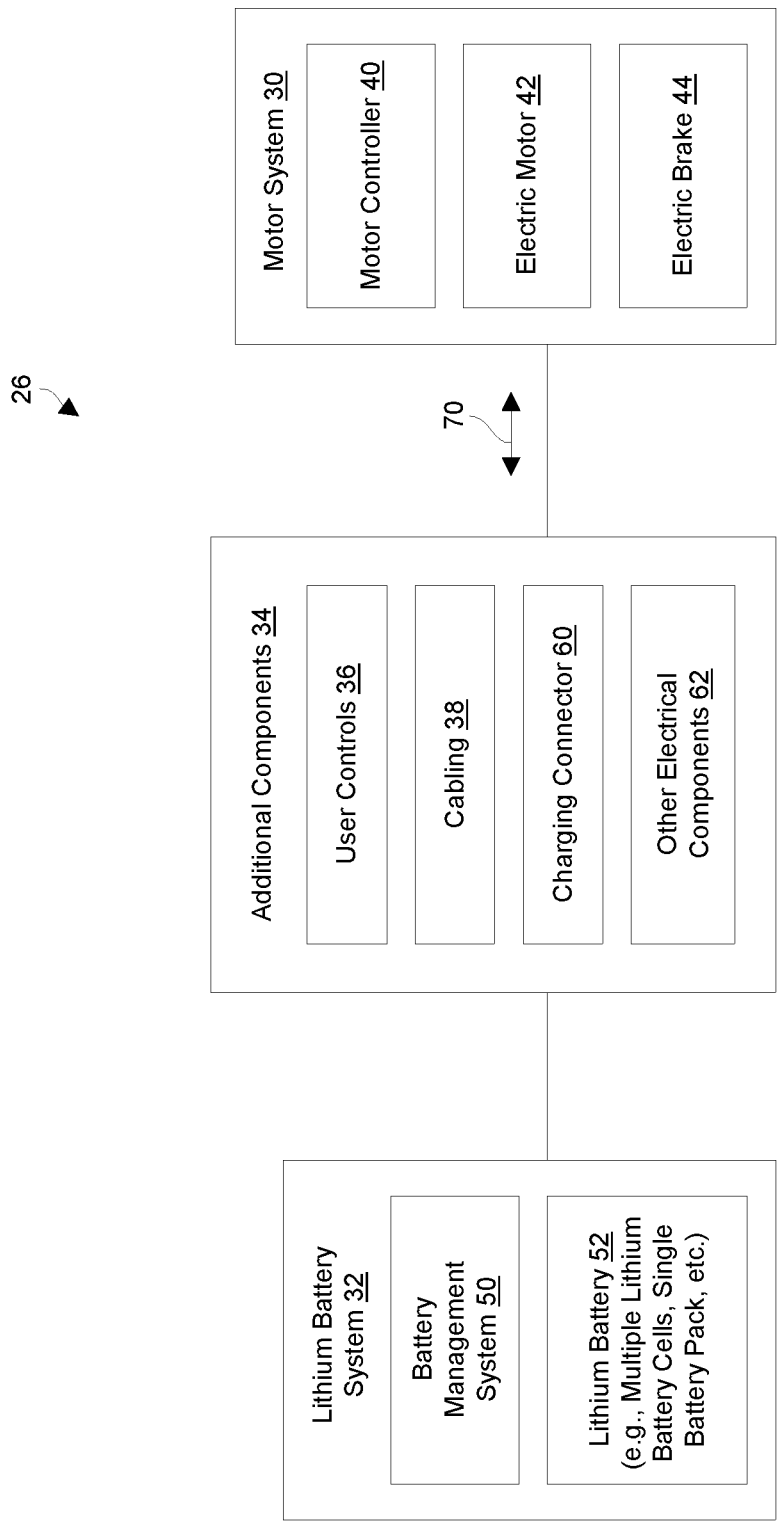
FIG. 2 is a block diagram of particular systems and components of the utility vehicle of FIG. 1 in accordance with some example embodiments.
Figure 3:
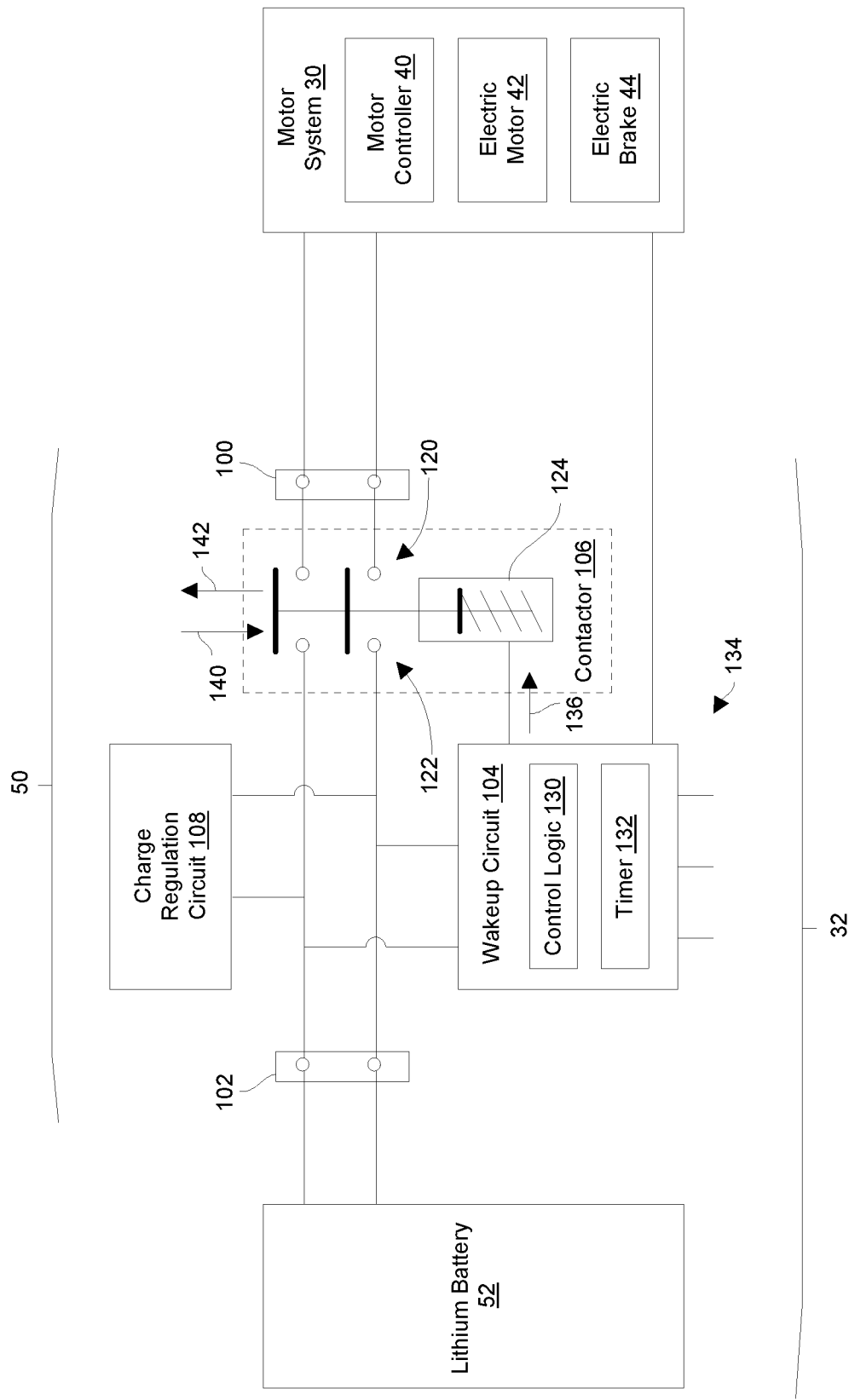
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40, an electric motor 42 which is linked to the set of tires 24 (FIG. 1), and an electric brake 44 coupled with the electric motor 42. The motor controller 40 of some embodiments controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (i.e., the utility vehicle 20 is awake but a user is not pressing on the accelerator pedal, the utility vehicle 20 is turned off, etc.), the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events such as sleep events (e.g., timeouts) to prevent excessive discharging of the lithium battery 52 thus safeguarding the lithium battery 52 from becoming over discharged. In some embodiments, the BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging connector 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol. In some arrangements, the other electrical components include one or more user signaling devices such as a backup/reverse buzzer, one or more lights, and so on to provide distinctive user notifications.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during discharging and charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
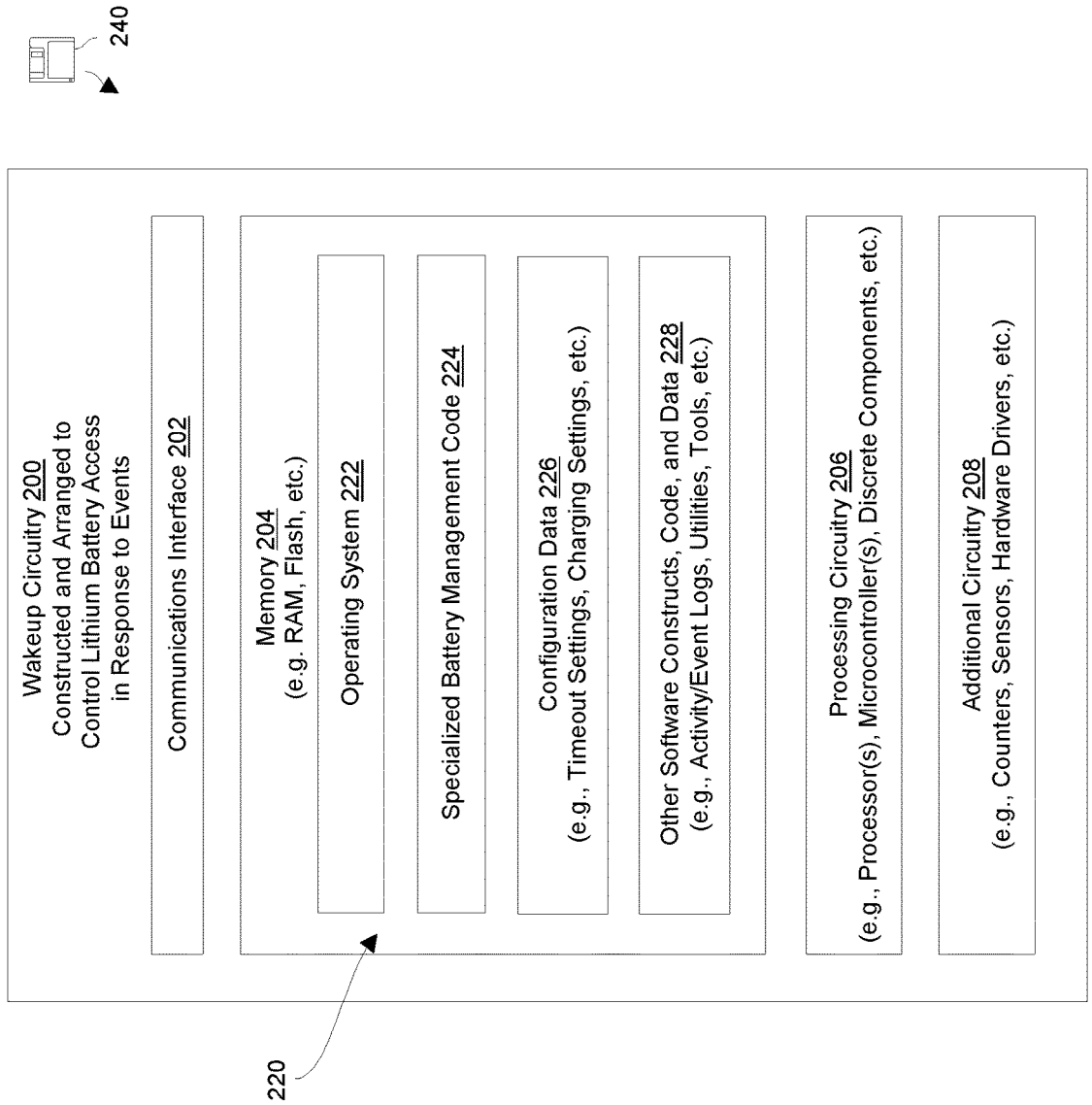
FIG. 4 is a block diagram of particular details of a wakeup circuit of a battery management system of the utility vehicle of FIG. 1 in accordance with some example embodiments.
Figure 5:
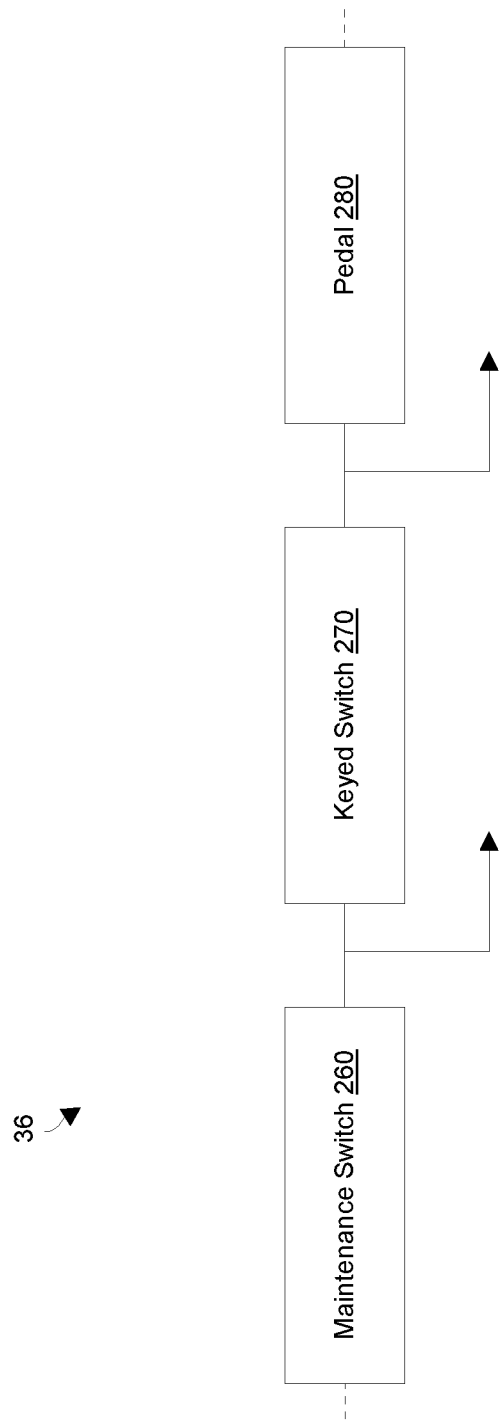
FIG. 5 is a block diagram of a first arrangement of particular user controls that provide input to the wakeup circuit of FIG. 4 in accordance with some example embodiments.
Figure 6:
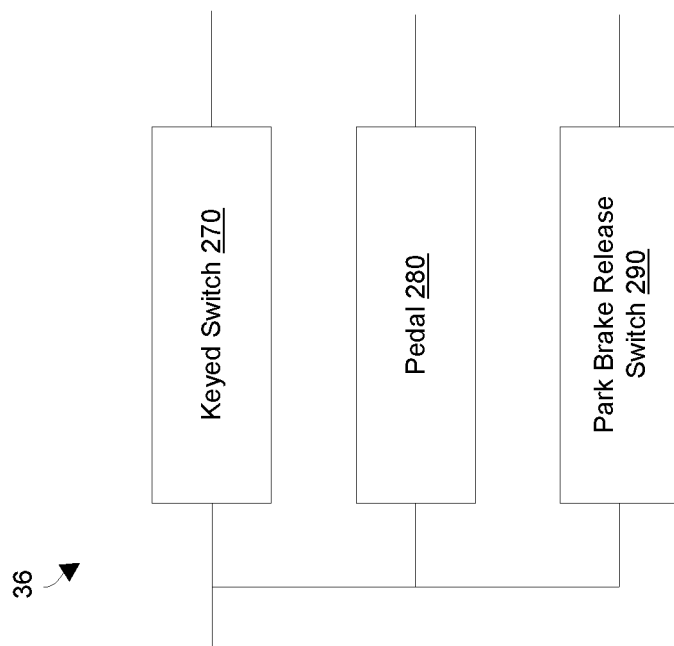
FIG. 6 is a block diagram of a second arrangement of particular user controls that provide input to the wakeup circuit of FIG. 4 in accordance with some example embodiments.

FIGS. 4 through 6 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which causes the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 reaches the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the lithium battery 52 thus improving efficiency.

Additional Details

Figure 7:
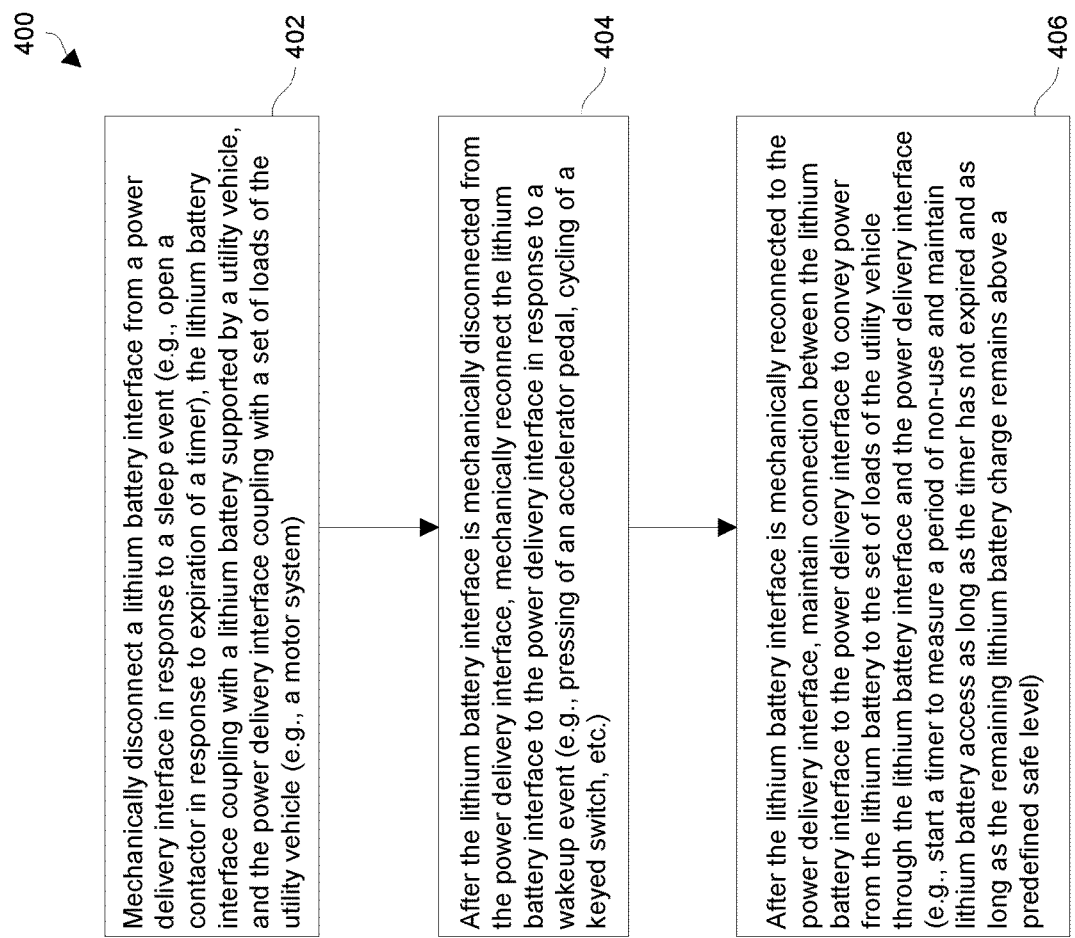
FIG. 7 is a flowchart of a procedure which is performed by the battery management system of the utility vehicle of FIG. 1 in accordance with some example embodiments.

FIG. 7 is a flowchart of a procedure 400 which is performed by the battery management system (BMS) 50 of the utility vehicle 20 to control access to the lithium battery 52 in accordance with some example embodiments.

At 402, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 404, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 406, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

Charging

Figure 8:
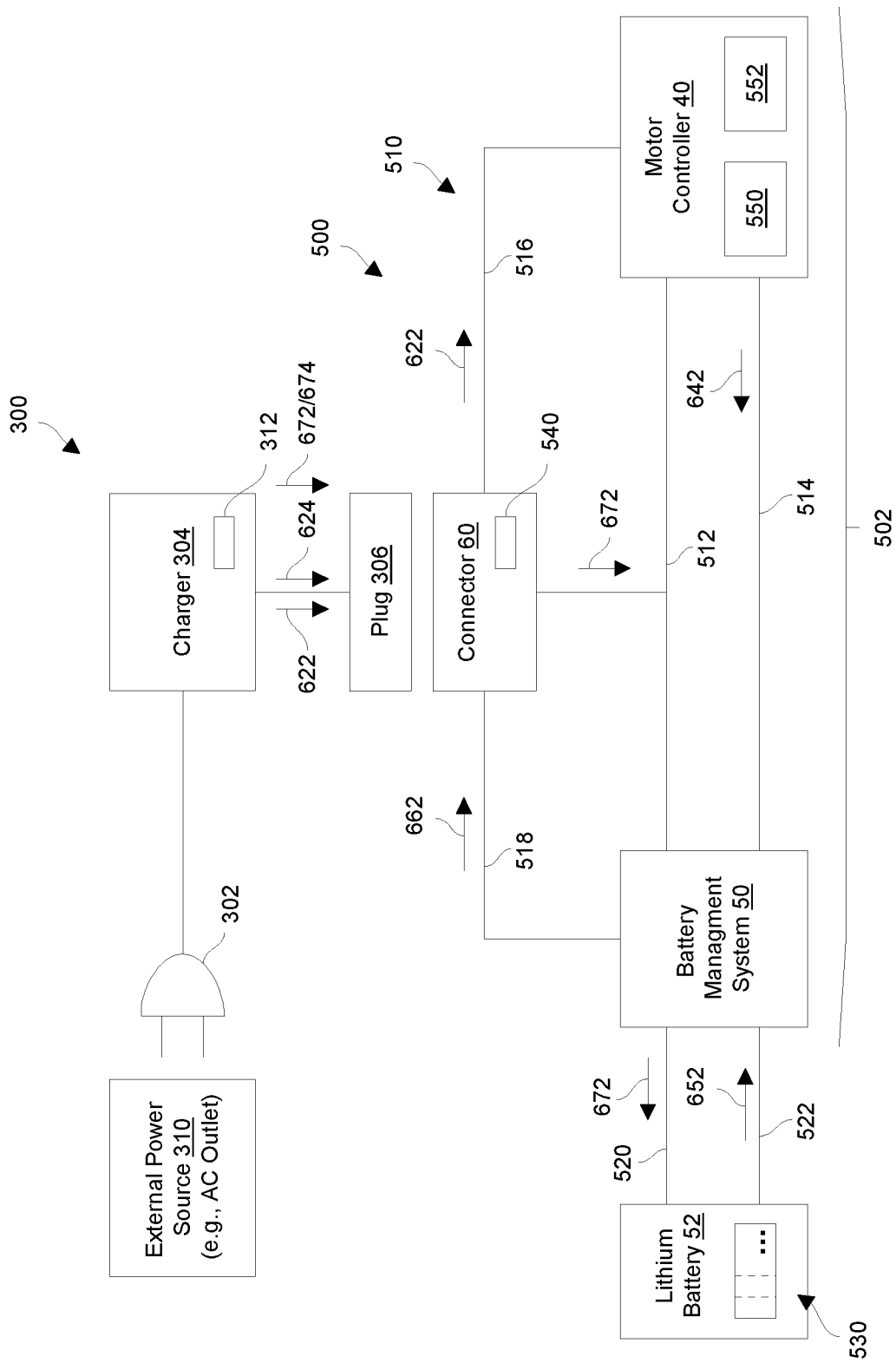
FIG. 8 is a block diagram of particular charging circuitry of the utility vehicle of FIG. 1 in accordance with some example embodiments.

FIG. 8 shows particular details of an external charger 300 and a charging system 500 of the utility vehicle 20. The external charger 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging connector 60 of the utility vehicle 20 (also see FIG. 2). The charger 304 is constructed and arranged to convert and condition a power signal from the external power source 310 for use by the utility vehicle 20.

In some embodiments, the charger 304 includes a display 312 to display information to a user. Along these lines, the display 312 may include light emitting diodes (LEDs) of different colors (e.g., green, red, etc.).

As shown in FIG. 8 and in accordance with some embodiments, the charging system 500 of the utility vehicle 20 is formed by the connector 60 (e.g., a receptacle or plug), the lithium battery 52, and control circuitry 502. Furthermore, the control circuitry 502 is formed by the BMS 50 and at least a portion of the motor controller 40.

Although some of the connecting pathways may have been mentioned and/or illustrated earlier, the various components of the charging system 500 couple via a variety of pathways 510, including any combination of multiple types of pathways 510 (also see the cabling 38 in FIG. 1). In some embodiments, the connector 60 couples with the motor controller 40 and the BMS 50 via a power bus 512. In some embodiments, the motor controller 40 and the BMS 50 communicate over a communications bus 514. In some embodiments, the connector 60 further couples with motor controller 40 via an interlock signal pathway 516. In some embodiments, the connector 60 further couples with BMS 50 via a control signal pathway 518.

Additionally, in some embodiments, the BMS 50 couples with the lithium battery 52 via a power pathway 520, and a set of communications pathways 522. The power pathway 520 carries power to and from the lithium battery 52. The set of communications pathways 522 enables the BMS 50 to receive information (e.g., battery status such as voltage and temperature measurements) from the lithium battery 52.

As further shown in FIG. 8 and in accordance with some embodiments, the lithium battery 52 includes multiple lithium modules 530. Each lithium module 530 may include several lithium cells as well as circuitry to output individual status such as that module's minimum and maximum voltage, that module's minimum and maximum temperature, etc.

In some embodiments, the connector 60 includes a display 540 to indicate charging information to a user. In certain embodiments, the display 540 includes an LED that provides status to the user via different blinking or flashing patterns. In accordance with some embodiments, in response to different charging commands that the external charger 300 receives from the utility vehicle 20, the external charger 30 may flash or not flash the LED at different rates (e.g., a first speed to indicate charging at a normal rate, a second speed to indicate charging at a slow rate, and no flashing to indicate that the external charger 300 is not charging the lithium battery 52, etc.).

In some embodiments, the motor controller 40 includes detection circuitry 550 and electric brake control circuitry 552. The detection circuitry 550 is configured to detect connection between the external charger 300 and the connector 60 and convey such connection status to the BMS 50. The electric brake control circuitry 552 is configured to control power to the electric brake 44 (FIG. 2). Further charging details will be provided with reference to FIGS. 8 and 9.

Figure 9:
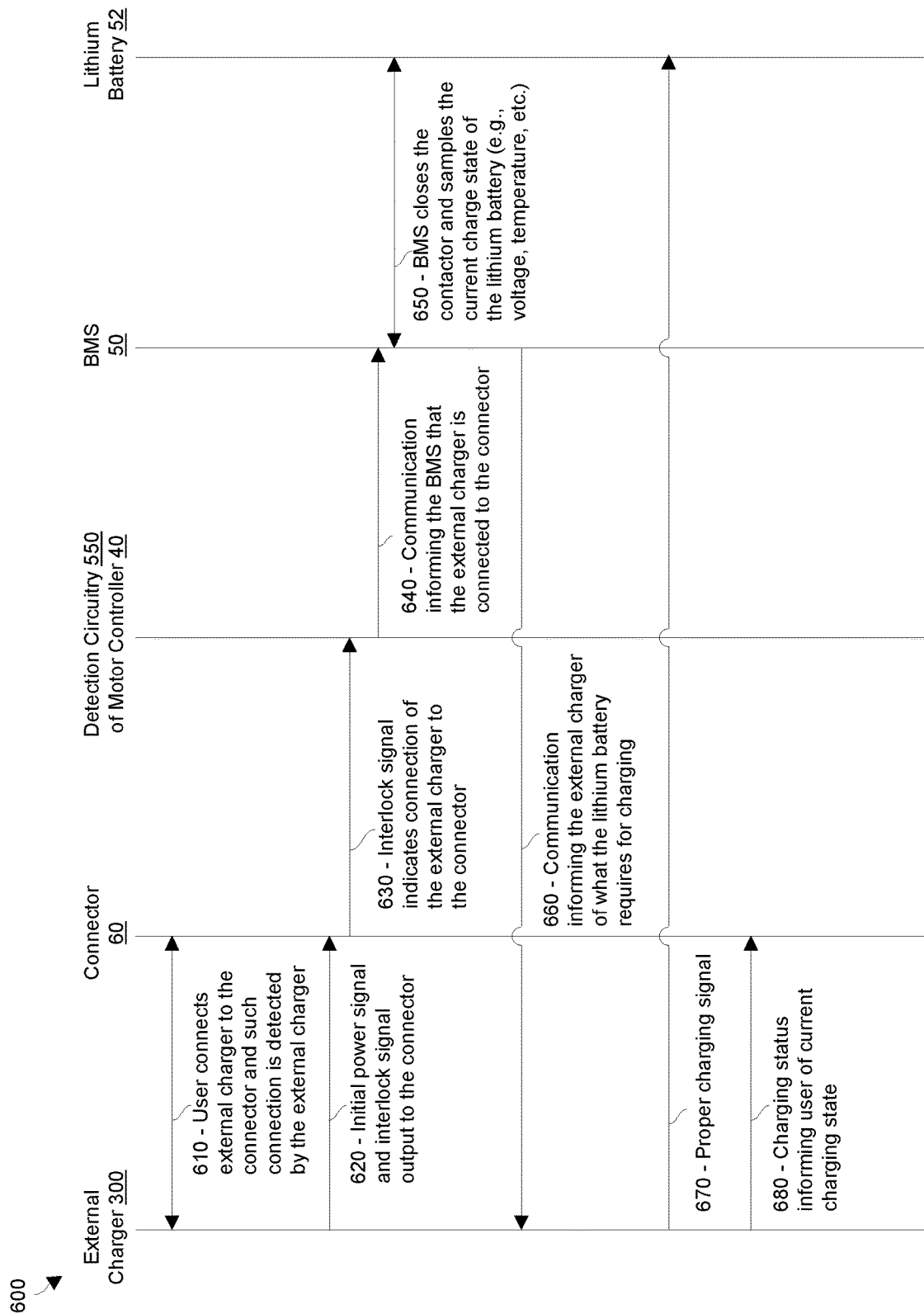
FIG. 9 is a sequence diagram illustrating particular charging activities that occur during lithium battery charging in accordance with some example embodiments.

FIG. 9 shows a sequence diagram 600 showing particular charging activities that occur during lithium battery charging in accordance with some embodiments. Suppose that a user wishes to charge the lithium battery 52 of the utility vehicle 20. In particular, the user may be ready to connect the external charger 300 to the connector 60 of the utility vehicle 20.

At 610, the user connects the external charger 300 to the connector 60 of the utility vehicle 20. In some embodiments, it does not matter whether the user plugs the external charger 300 into the external power source 310 (e.g., an AC outlet) before or after the user engages the plug 306 with the connector 60. Rather, the external charger 300 is considered properly connected to the connector 60 of the utility vehicle 20 once both events have occurred, i.e., the user has plugged the external charger 300 into the external power source 310 and the user engaged the plug 306 with the connector 60 (also see FIG. 8).

At 620, in response to the user plugging the external charger 300 into the external power source 310 and engaging the plug 306 with the connector 60, the external charger 300 outputs (i) an initial power signal 622 and (ii) an interlock signal 624 to the utility vehicle 20 (FIG. 8). In some embodiments, the initial power signal 622 is a temporary pulse (e.g., a 48 Volt power signal for a duration of six seconds). If the motor controller 40 and the BMS 50 are initially asleep, this initial power signal 622 wakes the motor controller 40 and the BMS 50 (e.g., the motor controller 40 and the BMS 50 power up and perform self-tests, the motor controller 40 and the BMS 50 perform sensing, etc.).

At 630, with the interlock signal 624 from the external charger 300 present at the connector 60 due to connection of the external charger 300 with the connector 60, the motor controller 40 detects the presence of the interlock signal 624 via the interlock signal pathway 516. In some embodiments, the detection circuitry 550 of the motor controller 40 tries to raise the interlock signal pathway 516 to a predefined voltage and a transistor in the connector 60 pulls that predefined voltage on the interlock signal pathway 516 low (e.g., to ground) in the absence of the external charger 300. When the user connects the external charger 300 to the connector 60, the transistor in the connector 60 stops pulling the predefined voltage on the interlock signal pathway 516 low in response to the interlock signal 624 from the external charger 300. As a result, the detection circuitry 550 detects that the external charger 300 is connected to the connector 60.

At 640, in response to detecting connection of the external charger 300 with the connector 60, the control circuitry 550 of the motor controller 40 sends a communication 642 (FIG. 8) to the BMS 50 informing the BMS 50 that the external charger 300 is connected to the connector 60. In some embodiments, the communication 642 is a CAN message that the motor controller 40 sends to the BMS 50 via a CAN bus (also see communications 70 in FIG. 2).

At 650, in response to the communication 642, the BMS 50 closes its contactor 106 (FIG. 3) and ascertains the current charge state of the lithium battery 52. In some embodiments, the BMS 50 routinely samples a current set of operating conditions 652 (FIG. 8) from the lithium battery 52 such as minimum and maximum voltage, minimum and maximum temperature, etc.

At 660, based at least in part on the current set of operating conditions 652, the BMS 50 provides a control signal 662 (FIG. 8) on the control signal pathway 518 to the external charger 300. In some embodiments, the control signal 662 informs the external charger 300 of what the lithium battery 52 requires for proper charging based on the condition of the lithium battery 52.

At 670, if the lithium battery 52 requires charging, the external charger 300 provides a proper power signal 672 (FIG. 8) to the lithium battery 52 based on the control signal 662. Additionally, in some embodiments and at 680, the external charger 300 provides a status signal 674 to the display 540 of the connector 60 to inform the user of the charging status (e.g., a slow blinking LED for a slow charge rate, a fast blinking LED for a normal charge rate, a solid LED for no charging due to the lithium battery being at full capacity, etc.). In some embodiments, the control signal 662, the interlock signal 624, and the status signal 674 are multiplexed through a cable connecting the charger 304 to the connector 60.

This above-described operation may continue until the lithium battery 52 is fully charged (e.g., repeating 630 through 670). In some embodiments, the BMS 50 is configured to routinely monitor the current charge state of the lithium battery 52 over time. If the BMS 50 determines that the lithium battery 52 requires different charging, the BMS 50 provides an appropriate control signal 662 to the external charger 300 causing the external charger to provide a proper power signal 672. It will be appreciated that such routine monitoring may encompass monitoring the current charge state of the lithium battery 52 over any of a variety of time intervals, including, for example, monitoring at various periodic intervals, monitoring at aperiodic intervals of varying time length, and/or in some embodiments, constant monitoring during one or more time periods. If the BMS 50 determines that the lithium battery 52 is fully charged, the BMS 50 provides an appropriate control signal 662 informing the external charger 300 to stop providing the power signal 672.

In some embodiments, the BMS 50 routinely samples, from all of the lithium modules 30, a current overall minimum voltage and a current overall maximum voltage. The BMS 50 compares these samples to a set of predefined voltage thresholds to determine whether the lithium battery 52 requires further charging or if the lithium battery 52 is fully charged. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

Additionally, in some embodiments, the BMS 50 routinely samples, a respective minimum temperature and a respective maximum temperature from each module 530. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

The BMS 50 further determines an overall current minimum temperature and an overall current maximum temperature for the lithium battery 52 as a whole from all of the respective module measurements. The BMS 50 compares these overall measurements to a set of predefined temperature thresholds to determine an appropriate rate of charge if any (also see the configuration data 226 in FIG. 4). For example, in accordance with some embodiments, the BMS 50 considers the lithium battery 52 ready to receive charging from the external charger 300 at a normal rate if the temperatures reside within a temperature range of 5 degrees Celsius to 45 degrees Celsius. Additionally, in accordance with some embodiments, the BMS 50 considers the lithium battery 52 ready to receive charging from the external charger 300 at a slow rate (i.e., a rate which is slower than the normal rate) if the temperatures reside within a defined suboptimal temperature range, which in some embodiments may include a defined suboptimal temperature range of −10 degrees Celsius to 5 degrees Celsius and/or within a suboptimal temperature range 45 degrees Celsius to 60 degrees Celsius (i.e., outside the range of 5 degrees Celsius to 45 degrees Celsius but within the range of −10 degrees Celsius to 60 degrees Celsius). It will be appreciated that such suboptimal temperature ranges may be selected and defined based on characteristics and tolerances of the lithium battery 52. Thus, alternative optimal and suboptimal ranges may be used in accordance with various embodiments. Furthermore, in accordance with some embodiments, the BMS 50 considers the lithium battery 52 not ready to receive charging from the external charger 300 (i.e., a fault situation) if the temperatures reside outside a defined temperature range, such as the temperature range of −10 degrees Celsius to 60 degrees Celsius.

In some embodiments, the control signal 662 takes the form of a pulse width modulation (PWM) signal to imitate electrical behavior of a thermistor. Here, the BMS 50 outputs signals of different pulse widths to convey, as commands to the external charger 300, the different charging requirements of the lithium battery 52 (e.g., full, charge at a slow rate, charge at a normal rate, or fault).

In some embodiments, if the charging criteria changes over time and the external charger 300 updates the power signal 672, the external charger 300 also updates the status signal 674 to the display 540 of the connector 60. Accordingly, the user is able to identify whether the lithium battery 52 is charging and, if so, at what current rate.

When the BMS 50 informs the external charger 300 that the lithium battery 52 should not be charged, the external charger 300 terminates the power signal 672 and sets its display 312 accordingly. In some embodiments, when the BMS 50 informs the external charger 300 that the lithium battery 52 is fully charged, the external charger 300 terminates the power signal 672 and provides a visual indication (e.g., lights a green LED) to inform the user. In some embodiments, when the BMS 50 informs the external charger 300 that the lithium battery 52 should not be charged due to a fault condition (e.g., a temperature reading outside a predefined temperature range), the external charger 300 terminates the power signal 672 and provides a visual indication (e.g., lights a red LED) to inform the user.

In response to determining that the lithium battery 52 is fully charged, the BMS 50 notifies the external charger 300 and goes to sleep by opening the contactor 106 (FIG. 3). In some embodiments, the BMS 50 may remain awake for a short time after the lithium battery 52 is fully charged. Along these lines, the control logic 130 of the BMS 50 may use the timer 132 (FIG. 3) to monitor inactivity time and then go to sleep if there is no further sensed electronic activity by the utility vehicle 20 before the timer 132 times out. That is, in response to expiration of the timer 132, the BMS 50 opens the contactor 106 and goes to sleep.

It should be understood that the various timeout times imposed by the timer 132 may be of different lengths depending on the particular circumstances. For example, the amount of time used by the timer 132 to monitor inactivity after lithium battery charging may be different from the amount of time used by the timer 132 to monitor inactivity after other events such as after the user has cycled the keyed switch 270 and/or after the user has let up on the accelerator pedal 280 after driving the utility vehicle 20. In some embodiments, the timer 132 uses a shorter timeout period to monitor inactivity in response to the lithium battery 52 being charged to full capacity.

In some embodiments, the pull-down transistor feature of the connector 60 operates as a safeguard in the event that the connector 60 is damaged and disconnects from the motor controller 40. In such a situation, the detection circuitry 550 of the motor control 40 will detect a high signal on the interlock signal pathway 516 since the detection circuitry 550 raises the voltage to a predefined level and the transistor in the connector 60 is unable to pull that signal down due to disconnection.

In some embodiments, when the detection circuitry 550 of the motor controller 40 detects connection between the external charger 300 and the connector 60 (e.g., due to the presence of the interlock signal 624 on the interlock signal pathway 516), the detection circuitry 550 causes the electric brake control circuitry 552 to prevent the electric brake 40 from energizing (also see FIG. 8). Accordingly, the utility vehicle 20 remains stationary. Further details will now be provided with reference to FIG. 10.

Figure 10:
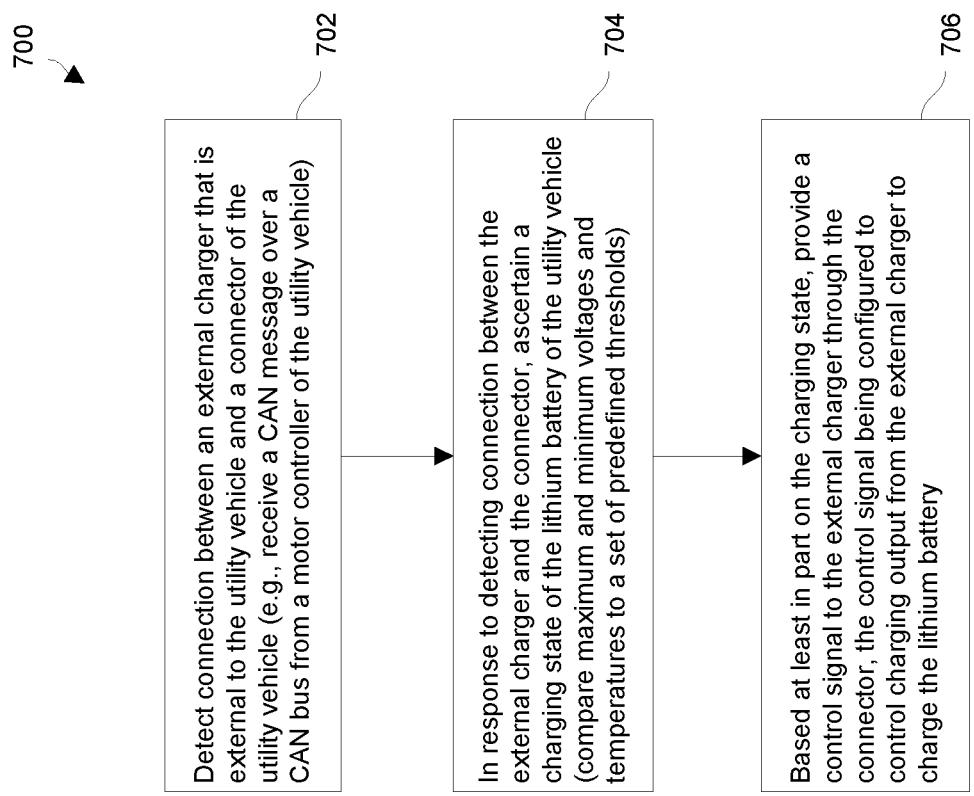
FIG. 10 is a flowchart of a procedure which is performed by circuitry of a utility vehicle during lithium battery charging in accordance with some example embodiments.

FIG. 10 is a flowchart of a procedure 700 which is performed by circuitry of a utility vehicle during lithium battery charging in accordance with some example embodiments. In some embodiments, the procedure 700 begins simply in response to a human user connecting an external charger to a charging connector of the utility vehicle.

At 702, the circuitry detects connection between an active external charger and a connector of the utility vehicle (e.g., a connection event). In some embodiments, a motor controller of the utility vehicle provides a communication (e.g., a CAN message) to a BMS of the utility vehicle informing the BMS that the utility vehicle's charging connector is connected to the external charger.

At 704, in response to detecting connection between the external charger and the connector, the circuitry ascertains a charging state of the lithium battery. In some embodiments, the circuitry samples maximum and minimum voltages and temperatures from individual lithium modules that form the lithium battery and compares these samples to a set of predefined thresholds to determine the current charging state of the lithium battery.

At 706, based at least in part on the charging state, the circuitry provides a control signal to the external charger through the connector. The control signal is configured to control charging output from the external charger to charge the lithium battery. In some embodiments, the external charger provides one of multiple different responses based on the control signal (e.g., terminate the charging signal due to the lithium battery being fully charged, provide a charge signal at a slow charge rate, provide a charge signal at a normal rate, terminate the charging signal due to a fault, etc.).

If the external charger is providing a charge signal to charge the lithium battery, the circuitry repeats 704 and 706. It will be appreciated that repetition of operations 704 and 706 may be performed at any of a variety of time intervals, including, for example, various periodic intervals, aperiodic intervals of varying time length, and/or in some embodiments, constant sampling during one or more time periods. As a result, the external charger continues to provide a charge signal and the lithium battery continues to charge.

When the lithium battery is fully charged, the circuitry detects this situation (e.g., based on monitoring the charging state of the lithium battery), and causes the external charger to terminate the charging signal. Additionally, the circuitry goes to sleep (e.g., after a short period of time) to prevent unnecessary discharging of the lithium battery.

As described above, improved techniques are directed to charging a lithium battery 52 of a utility vehicle 20 where a human user is able to initiate charging by simply connecting an external charger 300 to the utility vehicle 20. Such techniques do not require further human user input. Rather, the utility vehicle 20 is able to automatically respond by conveying charge from the external charger 300 to the lithium battery 52 and disconnecting the lithium battery 52 once the lithium battery 52 is fully charged. Accordingly, the human user does not need to remember to actuate a charge-enable switch and does not need to receive special training on how to operate such a switch.

In accordance with some embodiments, a charging system controls charging of a lithium battery powered car. Various features include charging initiation by plugging in charger only, dynamic charge rate adjustment based at least in part on battery temperature, and communication of status, control, and fault conditions between the BMS and charger.

In some embodiments, the components of the charging system include an off board battery charger, charger plug, charger receptacle, and BMS. The lithium battery couples with the BMS which disconnects the pack from the car when the car is not being used.

Conventional lithium battery powered vehicles require the operator to actuate a switch that tells the BMS to reconnect to the vehicle electrical system for charging. If the operator forgets to actuate the switch then the batteries won't charge.

However, in accordance with certain embodiments disclosed herein, the charge sequence is initiated by connecting the external charger to the charging connector of the utility vehicle. No other operator input is required. To accomplish this, the charger may sense a plug being plugged into a receptacle. The charger then applies a 6 second, 48 volt pulse to power the entire vehicle electrical system. This wakes up the BMS and the motor controller.

In some embodiments, the BMS does not have a direct input from the charger or connector indicating whether the charger is plugged in. Rather, the motor controller senses that the charger is plugged in through an interlock signal from the connector. The motor controller sends a message (e.g., a CAN message) to the BMS that the charger is plugged in. When the BMS receives this signal it closes its contactor to reconnect the batteries to the vehicle electrical system. As long as this signal is valid, the BMS will remain connected. Charging can then take place.

For some lead acid battery powered vehicles, the lead acid battery charger uses a thermistor on the batteries to sense battery temperature. Battery temperature is used to adjust certain charge parameters in the charger. The thermistor is connected to the charge connector which multiplexed the thermistor reading, the connector LED control, and charger interlock signals onto a single wire to the charger. For the lithium batteries, the thermistor signal may be repurposed into a charge control signal. A transistor can be added to the BMS which imitates a thermistor by using pulse width modulation (PWM). In some embodiments, the PWM duty cycle is divided into 4 distinct levels that represent Charger Full, Charging Allowed at a Slow Rate, Charging Allowed at the Normal Rate, and Fault. In some embodiments, the BMS allows full charge rate within a normal range of battery cell temperatures (5 to 45 degrees C.). In some embodiments, the slow charge rate is allowed over a slightly wider cell temperature range (−10 to 5, and 45 to 60 degrees C.). No charging is allowed outside of the wide temperature range. The system dynamically adjusts charge rates based on temperature with no operator input. When charging is complete, the BMS signals Charger Full to the charger, which terminates charging. The charger responds to a fault signal by lighting a fault indicator LED on the charger.

In accordance with some embodiments, system components include the charger, charger plug, charger receptacle, BMS, motor controller, and vehicle switches. The BMS and the motor controller communicate over the CAN bus. In some embodiments, the BMS monitors the status of 3 switch inputs: key switch, pedal switch, and park brake release switch. In some embodiments, the motor controller monitors the status of a Run/Tow switch. In some embodiments, the BMS sends a PWM signal to the charger via the charger plug and connector. The connector drives a charger interlock signal that is monitored by the motor controller. An LED on the connector is controlled by the charger and indicates charge status. The LED, interlock, and PWM signals are all multiplexed onto a single wire from the charger to the charger plug and connector. Circuits inside the charger and connector encode and decode the signals. For lithium, a lead acid battery temperature signal was not needed and was replaced by the PWM signal which relays status information from the BMS to the charger.

In accordance with some embodiments, when the charger is plugged into the car, charging initiates regardless of whether the BMS is asleep or awake. If the BMS is awake, plugging in the charger asserts the charger interlock signal from the charge connector to the motor controller. In some embodiments, the motor controller informs the BMS that the charger is plugged in via a status bit in a message (e.g., a CAN message). The BMS then sets the PWM signal appropriately (when not charging, the BMS sets the PWM signal to the Fault mode as a failsafe). Charging can then take place. The BMS stays awake until charging is complete, and goes to sleep shortly after charging is complete. Accordingly, the BMS knows that the charger is plugged in and can monitor for fault and warning conditions. If the charger is plugged into a vehicle where the BMS is asleep, then the charger provides power to the vehicle's electrical system. This wakes up the BMS and the motor controller. If the BMS receives a message (e.g., a CAN message) from the motor controller with the charging status bit set, then it will close its contactor and set the PWM signal appropriately. Charging then commences.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event).

User Notification

In accordance with some embodiments, the utility vehicle 20 generates a user notification when an external charger has been properly connected to the utility vehicle 20 (e.g., see the external charger 300 in FIG. 8). The user notification may be distinctive to particularly inform the user that the external charger has been properly connected to the utility vehicle 20 so that the user is able to move on to other tasks rather than place further time and effort into monitoring or double checking the equipment in order to make sure the external charger and the utility vehicle are connected and operating properly.

The operation of determining whether the external charger is properly in place is performed by circuitry of the utility vehicle 20 in accordance with some embodiments. Such circuitry may be formed by a portion of the motor system 30, the lithium battery system 32, and/or the additional components 34 (also see FIG. 2). Alternatively, some or all of the circuitry may reside elsewhere such as within the external charger, within an external server, and so on.

In some arrangements, the circuitry of the utility vehicle provides a notification signal to an external user device (e.g., a smart phone, a tablet, an external computer, etc.). Such communications may take place via a cable or wirelessly. In some arrangements, such communications take place through an intermediate external server that also logs and processes the notification signal.

Moreover, such communications may take the form of push notifications to inform the user (e.g., via a phone app, via a text message, etc.) that provides utility vehicle information such as lithium battery charge integrity verification status resulting from a pre-charge test routine. Along these lines, the user device may receive notification for a single vehicle or for multiple vehicles (e.g., in a fleet management scenario). Such operation may be performed in addition to or in lieu of a user notification that is directly output from the utility vehicle 20.

Figure 11:
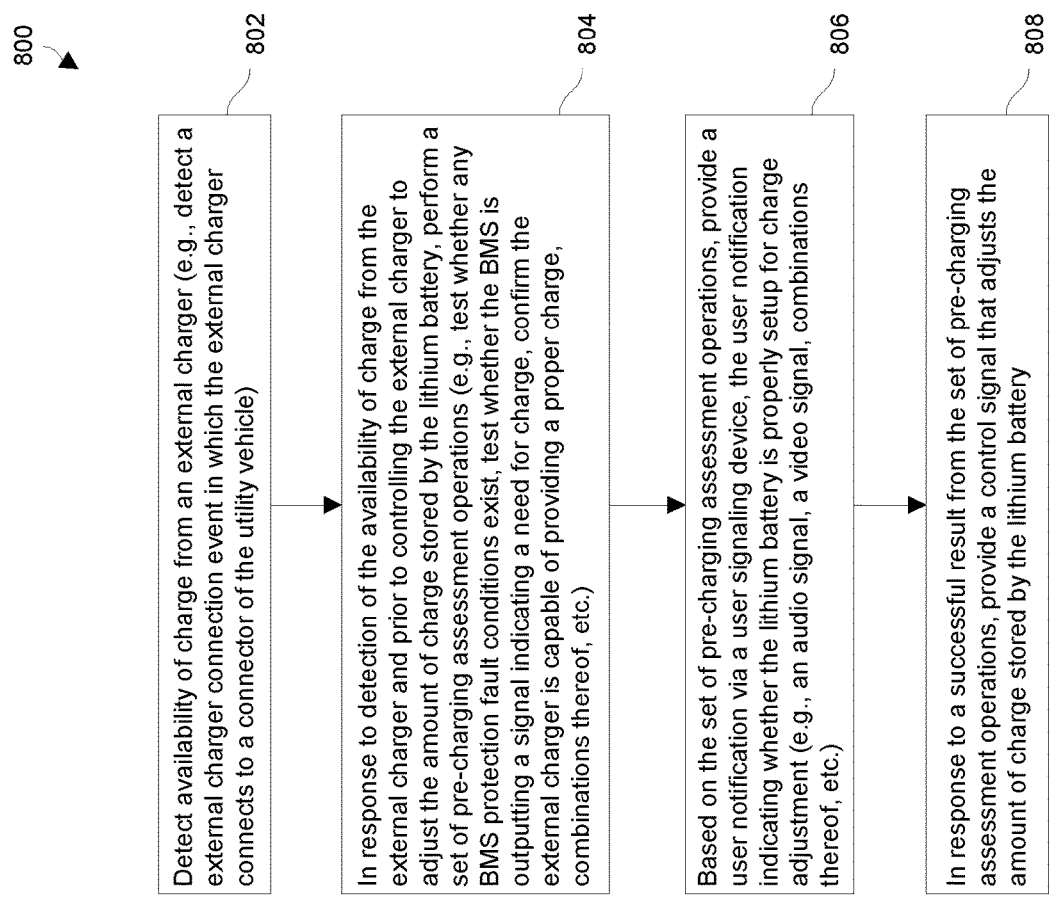
FIG. 11 is a flowchart of a procedure which is performed by circuitry of a utility vehicle when an external charger is connected to the utility vehicle in accordance with some example embodiments.

FIG. 11 shows a procedure 800 which, by way of example, is performed by the circuitry of the utility vehicle 20 to provide the user notification as well as adjust the amount of charge stored by the lithium battery 52 (e.g., to charge the lithium battery 52, also see FIG. 2) when the external charger is connected to the utility vehicle 20 (FIG. 8). As part of this process, the circuitry provides the user notification when the external charger is properly connected.

At 802, the circuitry detects availability of charge from the external charger. For example, such detection may occur when a user connects the external charger to a connector of the utility vehicle 20.

At 804, in response to detection of the availability of charge from the external charger and prior to controlling the external charger to adjust the amount of charge stored by the lithium battery, the circuitry performs a set of pre-charging assessment operations. In some embodiments, the detection circuitry 550 is operative to detect connection between the external charger 300 and the connector 60 and convey such connection status to the BMS 50 (also see FIG. 8). Moreover, the BMS 50 and the motor controller 40 are able to coordinate their operation and determine a result the set of pre-charging assessment operations indicating either that the lithium battery 52 should be charged (i.e., a successful result) or not charged (i.e., an unsuccessful result).

In some embodiments, when the circuitry detects connection of the external charger, the circuitry tests whether any of a plurality of BMS protection fault conditions exist and then generates a pre-charging assessment indication based on whether any of the plurality of BMS protection fault conditions exist. Here, the circuitry evaluates aspects such as current lithium battery temperature and voltage measurements from the lithium battery by reading such measurements and comparing them to a set of predefined thresholds, status flags, warning signals, etc. to determine whether any of the plurality of BMS protection fault conditions exist. For example, the circuitry may determine that the lithium battery 52 is too cold or too warm (i.e., fault conditions) to safely receive a charge. As another example, the circuitry may determine that the lithium battery 52 has been extremely undercharged (i.e., another fault condition) and is no longer safe to receive a charge, and so on.

In some embodiments, when the circuitry detects connection of the external charger 300, the circuitry tests whether the lithium battery 52 is to receive charge from the external charger, and generate a pre-charging assessment indication based on whether the lithium battery 52 is to receive charge from the external charger. Here, the circuitry ascertains a current amount of charge stored by the lithium battery 52, and compares the current amount of charge to a predefined target charge range to determine whether the lithium battery is to receive charge from the external charger. If the amount of charge is already within the predefined target charge range, the circuitry does not charge the lithium battery because there is no need to charge the lithium battery 52. However, if the amount of charge is below the predefined target charge range, the circuitry determines that the lithium battery is ready for charging.

In some embodiments, when the circuitry detects connection of the external charger, the circuitry tests whether the external charger is operative to provide a predefined voltage to charge the lithium battery 52, and generate a pre-charging assessment indication based on whether the external charger is operative to provide the predefined voltage to charge the lithium battery 52. Here, the circuitry measures a current supply voltage provided by the external charger, and compares the current supply voltage to a predefined supply voltage threshold. If the external charger does not provide the predefined voltage, the circuitry determines that the external charger is not ready to charge the lithium battery 52. However, if the external charger is currently operative to provide the predefined voltage, the circuitry concludes that the external charger is ready to charge the lithium battery 52.

In some arrangements, the circuitry does not charge the lithium battery 52 unless multiple conditions described above are in place before charging the lithium battery 52. In certain embodiments, the circuitry does not charge the lithium battery 52 unless no BMS protection fault conditions exist, the BMS outputs a signal indicating that the lithium battery 52 is ready to receive charge from the external charger, and the external charger 300 has demonstrated that the external charger 300 is prepared to provide the predefined voltage.

At 806, the circuitry provides a user notification via the user signaling device based on the set of pre-charging assessment operations, the user notification indicating whether the lithium battery is properly setup for charge adjustment. It should be understood that a variety of user output indicators are suitable for use. For example, such notification may be in the form of one or more audio signals (e.g., one or more buzzes, beeps, bell tones, other distinctive noises, combinations thereof, etc.) and/or one or more video signals (e.g., one or more solid or blinking lights, output on one or more segmented displays, output on a graphical screen or monitor, combinations thereof, etc.). For example, in some embodiments, notification may be provided via a backup/reverse buzzer, headlights, taillights, some combination thereof, and/or the like of the utility vehicle 20. Moreover, the absence of a particular type of output (e.g., silence) may operate as an indicator (e.g., an indication of a fault situation, improper connection, etc.).

In some arrangements, the circuitry provides a particular user notification if the lithium battery is properly setup for charge adjustment, and a different user notification if the lithium battery is not properly setup for charge adjustment. The differences may be different sounds, noises, video indications, and so on. In some arrangements, silence and no video indicates that the lithium battery is not properly setup for charge adjustment.

Once the user receives a successful result as the user notification, the user knows that the external charger is properly connected and that the utility vehicle 20 has concluded that the lithium battery 52 is ready for charge adjustment based on the successful result from the set of pre-charging assessment operations. Accordingly, the user may move on to another task such as attending to another utility vehicle 20 if managing a fleet of utility vehicles 20.

At 808 and in accordance with some embodiments, based on a successful result from the set of pre-charging assessment operations, the circuitry of the utility vehicle 20 provides a control signal that adjusts the amount of charge stored by the lithium battery 52. For example, the circuitry may signal the external charger to provide charge in order to charge the lithium battery 52. In response the external charger 300 provides charge (e.g., through the connector 60, also see FIG. 8) to charge the lithium battery 52.

In some arrangements, the circuitry signals the external charger to provide charge at a particular charge rate (e.g., a full charge rate, a less than full charge rate due to suboptimal temperature, etc.). In some arrangements, the circuitry notifies the external charger to provide no charge but instead allow the utility vehicle to discharge the lithium battery 52 for storage purposes. Other charge adjustment operations are suitable for use as well.

It should be understood that if the circuitry determines that the lithium battery is not properly setup for charge adjustment, (e.g., there is a fault condition), the set of pre-charging assessment operations provides an unsuccessful result (e.g., a different audio output, a different visual output, combinations thereof, silence, etc.) and the circuitry does not provide the control signal.

Fleet Management System Equipped with User Notification

Figure 12:
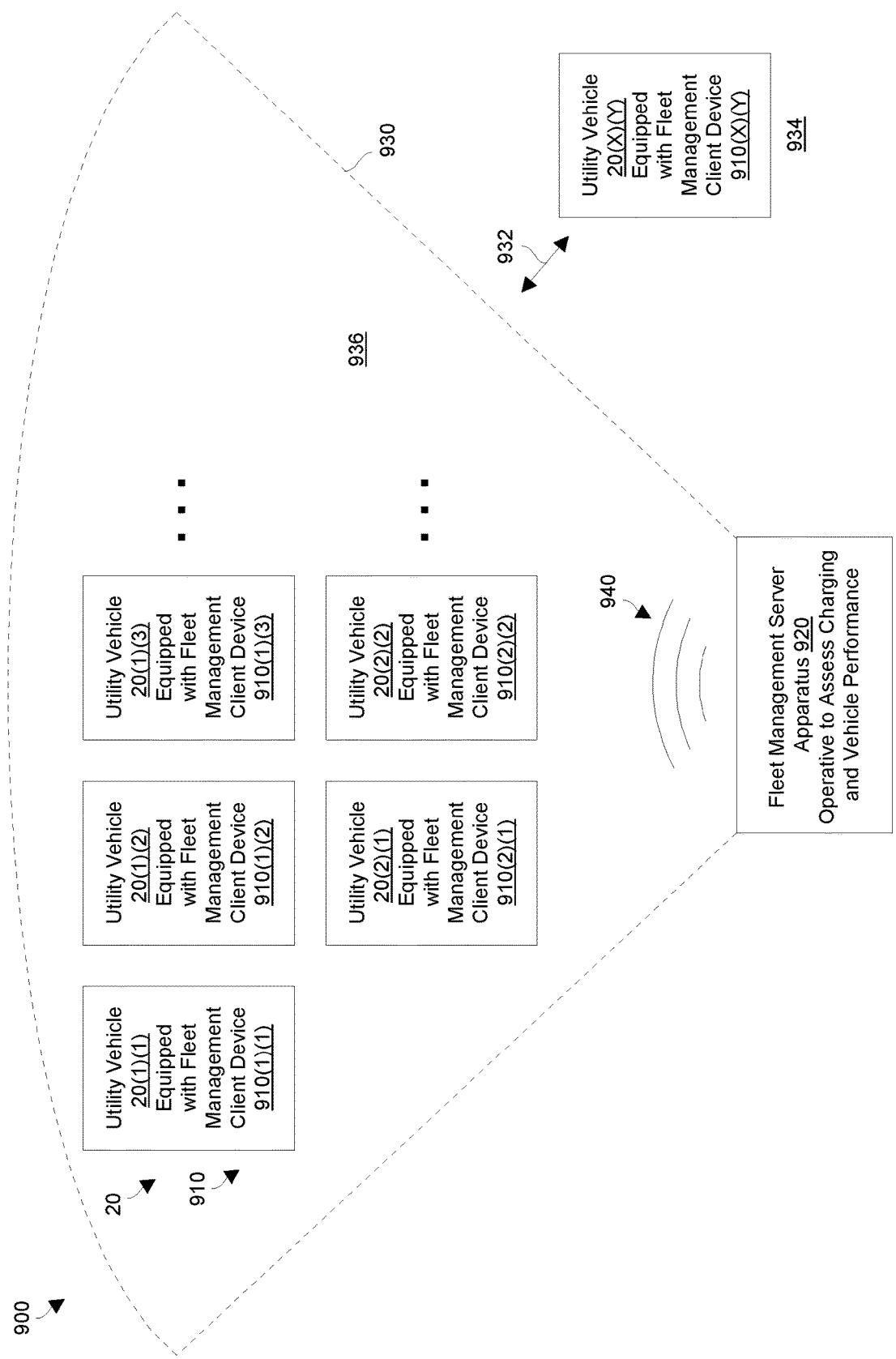
FIG. 12 is a block diagram of an electronic environment which includes multiple utility vehicles equipped with respective fleet management client devices and a fleet management server apparatus in accordance with some example embodiments.

FIG. 12 shows particular details of a fleet management system 900 that includes utility vehicles 20(1)(1), 20(1)(2), 20(1)(3), . . . , 20(2)(1), 20(2)(2), . . . , 20(X)(Y), . . . , and so on (collectively, utility vehicles 20) which are equipped with fleet management client devices 910(1)(1), 910(1)(2), 910(1)(3), . . . , 910(2)(1), 910(2)(2), . . . , 910(X)(Y), . . . , and so on (collectively, fleet management client devices 910), respectively, where X (e.g., the row of the utility vehicle 20) and Y (e.g., the position of a utility vehicle 20 within a row, etc.) are positive integers. Additionally, the fleet management system 900 includes a fleet management server apparatus 920 that is operative to assess and/or track various vehicle information (e.g., lithium battery status, etc.).

In some arrangements, the fleet management server apparatus 920 receives the results of the pre-charge assessment operations performed by each utility vehicle 20 of the fleet. Along these lines, the fleet management server apparatus 920 is then able to identify which utility vehicles 20 are not properly charged, cars with faulty lithium battery systems 32, faulty external chargers 300, and so on.

It should be understood that the fleet management system 900 includes a fleet management network environment 930 that facilitates communications 940 between the fleet management client devices 910 and the fleet management server apparatus 920. Such communications 940 may occur through wires (e.g., copper-based, fiber-based, etc.), may be wireless (e.g., WiFi, cellular, Bluetooth, infrared, etc.), may involve further data communications devices (e.g., routers, firewalls, bridges, gateways, etc.), combinations thereof, and so on.

In some embodiments, users are able to drive the utility vehicles 20 into and out of the fleet management network environment 930 (see the double arrow 932). When a user drives a utility vehicle 20 from a location 934 which is outside a fleet management network environment 930 to a location 936 which is within the fleet management network environment 930, the fleet management client device 910 of that utility vehicle 20 and fleet management server apparatus 820 are able to communicate with each other. For example, the user may be driving the utility vehicle 20 from a work site or field area (e.g., the location 934) back to maintenance or storage area (e.g., the location 936). To initiate such communications, the fleet management client device 910 may be able to auto detect a wireless network if the network environment 930 is equipped with wireless transceivers. Alternatively, a user may physically connect the fleet management client device 910 to the network environment 930 (e.g., via a plug, a jack, etc.).

As a utility vehicle 20 is driven around, the fleet management client device 910 of that utility vehicle 20 routinely monitors and collects activity information regarding that utility vehicle 20. For example, the client device 910 stores (or logs) lithium battery information (e.g., charge levels, temperature levels, lithium battery fault conditions, lithium battery state transitions, etc.). The client device 910 may further store other information such as motor controller events (e.g., motor controller state transitions, motor controller fault conditions, etc.).

Additionally, when the fleet management client device 910 of a utility vehicle establishes a connection with the fleet management server apparatus 920, the client device 910 delivers the collected activity information to the server apparatus 920. Such a connection may be established when a user drives the utility vehicle 20 within range of a wireless network or when the user connects a network cable to the utility vehicle 20. Other situations are suitable as well (e.g., cellular transmissions, longer range wireless metropolitan area network transmissions or WiMax, etc.).

Once a connection is established, the fleet management client device 910 of the utility vehicle and the fleet management server apparatus 920 are able to communicate with each other and the information may be transferred from the fleet management client device 910 to the fleet management server apparatus 920 at any time. In some embodiments, the client device 910 begins the information transfer process as soon as the client device 910 discovers (or handshakes with) the server apparatus 920. Accordingly, the server apparatus 920 is able to obtain a record of activities for each utility vehicle 20 that connects to the network environment 930.

One should appreciate that the fleet management network environment 930 is well-suited for certain applications such as a fleet of golf cars utilized by a golf course. In such a situation, human users may drive the golf cars (i.e., the utility vehicles 20) to a holding area (e.g., a barn or shed which enjoys coverage by the network environment 930) for overnight lithium battery recharging (e.g., at the ends rounds of golf, at the end of the day, etc.). While the golf cars reside in this holding area to recharge, the fleet management client devices 910 communicate their logged activities for the day to the fleet management server apparatus 920. In turn, the fleet management server apparatus 920 may evaluate the logged activities as well as current charging behavior and provide extensive evaluation results (e.g., reports, analyses, diagnostics, notifications, alerts, etc.) for subsequent servicing by a human technician. Along these lines, during the next morning, the human technician may review the evaluation results to determine which golf cars have fully charged lithium batteries 52 and are available for use versus other golf cars that either don't have fully charged lithium batteries 52 or perhaps require servicing for other reasons (e.g., faulted electrical systems, faulted external chargers 300, etc.). Further details will now be provided with reference to FIG. 13.

Figure 13:
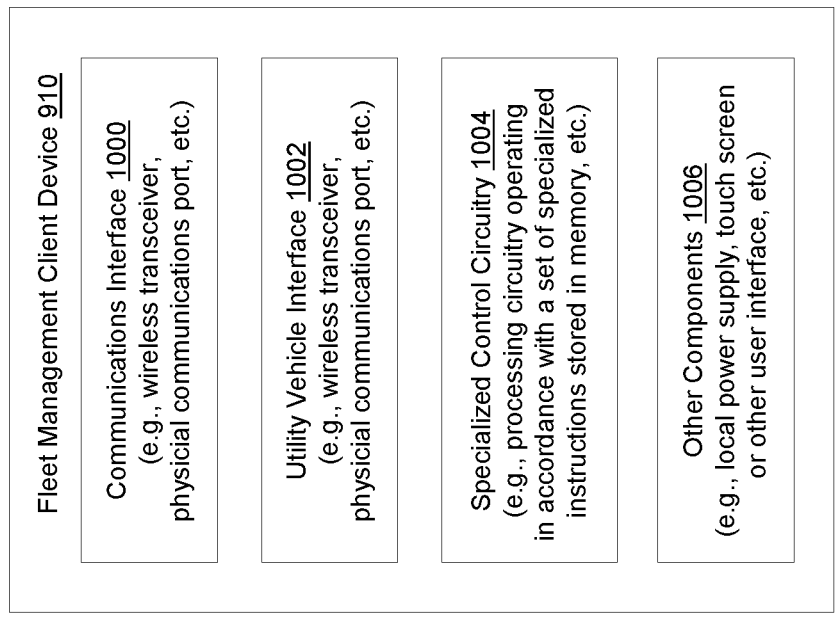
FIG. 13 is a block diagram of a fleet management client device in accordance with some example embodiments.

FIG. 13 shows particular details of a fleet management client device 910 (also see FIG. 12). The fleet management client device 910 includes a communications interface 1000, a utility vehicle interface 1002, and specialized control circuitry 1004 which couples with the communications interface 1000 and the utility vehicle interface 1002. In some embodiments, the fleet management client device 910 includes other components 1006 such as a local power supply which is operative to receive charge from the BMS 50 (also see FIG. 2) and/or an external charger (also see FIG. 8), a touch screen or other user interface, and so on.

It should be understood that the fleet management client device 910 is supported by the utility vehicle body 22 and electrically couples with the motion control system 26 (also see FIG. 1). In some arrangements, the fleet management client device 910 has the form factor of a tablet device (e.g., a regular-sized tablet, a mini tablet, etc.). In other arrangements, the fleet management client device 910 has the form factor of module or package which mounts to the utility vehicle body 22. Other form factors are suitable for use as well.

The communications interface 1000 (e.g., a wireless transceiver, a physical communications port, combinations thereof, etc.) is constructed and arranged to connect the fleet management client device 910 to a communications medium that enables communications with other electronic components of the fleet management system 900. Such communications may be IP-based, SAN-based, cellular-based, cable-based, fiber-optic based, wireless (cellular, RF, infrared, etc.), cloud-based, combinations thereof, and so on. Accordingly, the communications interface 1000 enables the fleet management client device 910 to robustly and reliably communicate with other external apparatus.

The utility vehicle interface 1002 (e.g., a wireless transceiver, a physical communications port, etc.) is constructed and arranged to connect the fleet management client device 910 to the motor control system 26 of a utility vehicle 20. Again, such communications may be IP-based, SAN-based, cellular-based, cable-based, fiber-optic based, wireless (cellular, RF, infrared, etc.), combinations thereof, and so on. In certain embodiments, the utility vehicle interface 1002 includes a cable harness that enables the fleet management client device 910 connect to the cabling 38 (FIG. 1), e.g., to monitor electronic CAN messages in accordance with the CAN protocol, etc. In some arrangements, the communications interface 1000 and the utility vehicle interface 1002 share the same hardware.

The specialized control circuitry 1004 is constructed and arranged to work in tandem with the circuitry of the motor control system 26. Along these lines, the specialized control circuitry 1004 includes memory (or a buffer) which logs motor control system events during the course of utility vehicle operation. Then, when the utility vehicle 20 establishes a connection with the fleet management server apparatus 920, the specialized control circuitry 1004 transmits (e.g., uploads) the collected events from the memory to the fleet management server apparatus 920 (FIG. 12) for processing. In some embodiments, at least some of the specialized control circuitry 1004 is formed by memory that stores specialized instructions (e.g., code) and processing circuitry that operates in accordance with the specialized instructions.

The other circuitry 1006 refers to additional and perhaps optional components of the client device 910. Along these lines, the client device 910 may be a modularized smart device that includes a local power supply, a user interface (e.g., a touchscreen), a camera, microphones and speakers, a set of accelerometers, a set of gyroscopes, an altimeter, global positioning system (GPS) circuitry, and so on. The local power supply enables the client device 910 even if the lithium battery 52 that drives the motor control system 26 of the utility vehicle 20 is unavailable. The user interface enables a user to perform other operations and useful work (e.g., determine a location on a golf course to distance to golf course landmarks, enter scores, contact the club house, access news or other services/information, etc.).

In some arrangements, the client device 910 includes location identification circuitry (e.g., GPS circuitry) which provides a location signal that identifies a current geolocation of the golf car on the golf course. A touch screen of the client device 910 is configured to receive golf course data that is based on the current geolocation of the electric golf car from the control circuitry and visually display the golf course data (e.g., how far the client device 910 is from a hole location) concurrently while the client device 910 contemporaneously records the series of lithium battery conditions captured over time.

In accordance with some embodiments, at least some of the utility vehicle circuitry that performs pre-charge assessment and which is the source of various vehicle event information resides outside the client device 910 (e.g., see the lithium battery system 32 and/or the motor system 30 in FIG. 2). In some arrangements, the client device 910 effectively relays this information (e.g., battery data, current utility vehicle settings, utility vehicle events, etc.) to the fleet management server apparatus 920 (FIG. 12). In certain arrangements, the client device 910 enhances this information with additional information such as timestamps, vehicle geolocation, ambient temperature, etc. before conveying the information to the fleet management server apparatus 920.

Furthermore, in some arrangements, the client device 910 provides the user notification. Along these lines, the client device 910 (e.g., in the form factor of a smart phone, a tablet, etc.) may output one or more sounds to the user via its speaker and/or one or more visual notifications via its screen or LED. Further details will now be provided with reference to FIG. 14.

Figure 14:
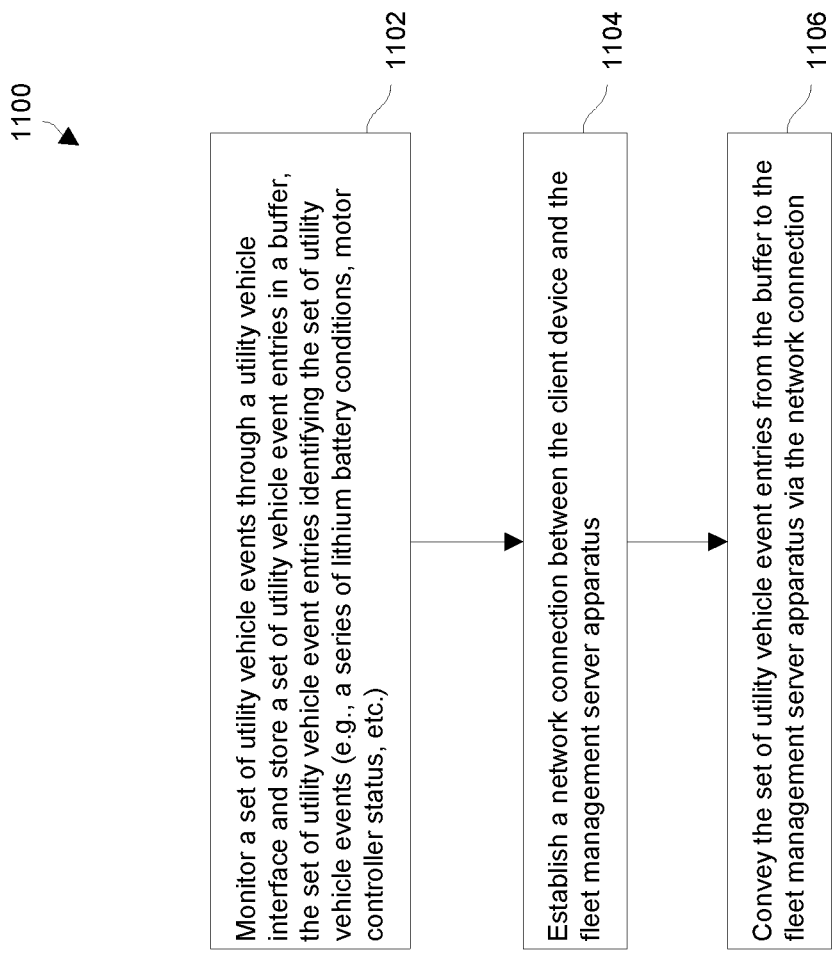
FIG. 14 is a flowchart of a procedure which is performed by a fleet management client device in accordance with some example embodiments.

FIG. 14 shows a procedure 1100 which is performed by the fleet management client device 910 of a utility vehicle 20. In some embodiments, the client device 910 remains in operation at least as long as the utility vehicle 20 is awake.

At 1102, circuitry of the client device 910 monitors a set of utility vehicle events through the utility vehicle interface 1002 and stores a set of utility vehicle event entries in a buffer. The set of utility vehicle event entries identifies the set of utility vehicle events. For example, in some embodiments, the set of entries includes a series of lithium battery conditions captured over time such as cell voltage and temperature measurements, captured fault conditions, state transitions such as transitions into or from sleep mode, storage mode, charging mode, and so on. Other information may be recorded as well such as motor controller status, towing status, and so on.

At 1104, the circuitry of the client device 910 establishes a network connection between the client device 910 and a fleet management server apparatus 920 through a communications interface of the fleet management client device. For example, the client device 910 may have come with range of a wireless network, a user may have connected a network cable to the client device 910, etc.

At 1106, the circuitry of the client device 910 conveys the set of utility vehicle event entries from the buffer to the fleet management server apparatus via the network connection. Accordingly, charge verification determination is able to be sent (wirelessly or over wired network) to a fleet management system such that the system gathers charge verification data for all cars in the fleet, which can help identify cars that are not properly charged, cars with faulty BMS's, faulty chargers, etc.

Figure 15:
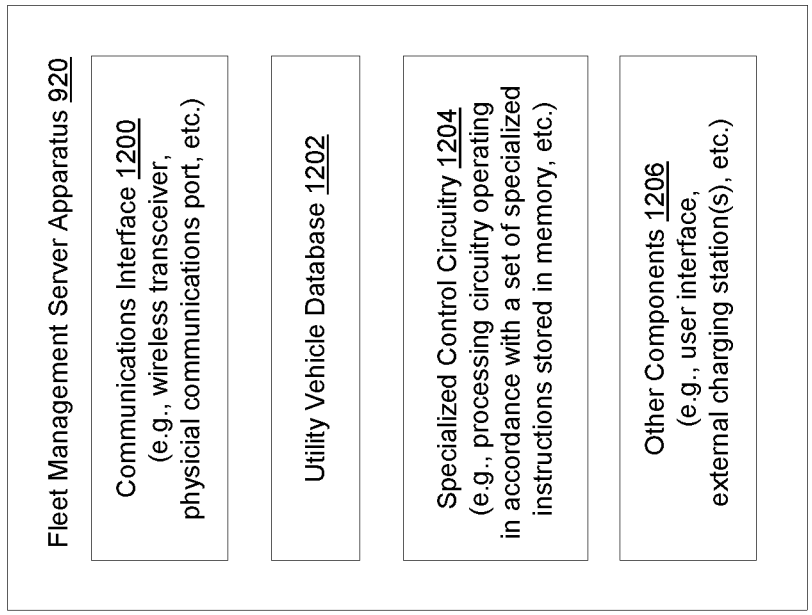
FIG. 15 is a block diagram of a fleet management server apparatus in accordance with some example embodiments.

FIG. 15 shows particular details of a fleet management server apparatus 920 (also see FIG. 12). The fleet management server apparatus 920 includes a communications interface 1200, a utility vehicle database 1202, and specialized control circuitry 1204 which couples with the communications interface 1200 and the utility vehicle database 1202. In some embodiments, the fleet management server apparatus 920 includes other components 1206 such as a user interface, one or more external charging stations (also see the external charger 300 in FIG. 8), and so on.

It should be understood that the fleet management server apparatus 920 may form part of an enterprise computer system such as standalone server equipment, a cluster of computers in a central office, and/or a cloud infrastructure. In some arrangements, the fleet management server apparatus 920 has the form factor of mainframe, a cluster of computers, a server farm, and/or a distributed computing system. Other form factors are suitable for use as well.

The communications interface 1200 (e.g., a wireless transceiver, a physical communications port, etc.) is constructed and arranged to connect the fleet management server apparatus 920 to a communications medium that enables communications with other electronic components the fleet management system 900 (also see FIG. 12). Such communications may be IP-based, SAN-based, cellular-based, cable-based, fiber-optic based, wireless (cellular, RF, infrared, etc.), cloud-based, combinations thereof, and so on. Accordingly, the communications interface 1200 enables the fleet management server apparatus 920 to robustly and reliably communicate with other external apparatus.

The utility vehicle database 1202 is constructed and arranged to store utility vehicle information from a fleet of utility vehicles 20. Along these lines, the utility vehicle database 1202 is able to access (i.e., store and retrieve) vehicle data for different utility vehicles 20 at the same time (e.g., save vehicle data from multiple vehicles concurrently, save vehicle data from one vehicle while concurrently reading and evaluating vehicle data from another vehicle, etc.).

The specialized control circuitry 1204 is constructed and arranged to perform a variety of monitoring and control activities. Along these lines, the specialized control circuitry 1204 detects establishment of network connections between the fleet management server apparatus 920 and the respective fleet management client devices 910 of the fleet of utility vehicles 20 through the communications interface 1200, collect respective sets of utility vehicle event entries from the fleet of utility vehicles 20 through the communications interface 1200 and store the respective sets of utility vehicle event entries in the utility vehicle database 1202 and, based on the respective sets of utility vehicle event entries stored in the utility vehicle database 1202, perform a set of utility vehicle conditioning activities. Further details will now be provided with reference to FIG. 16.

Figure 16:
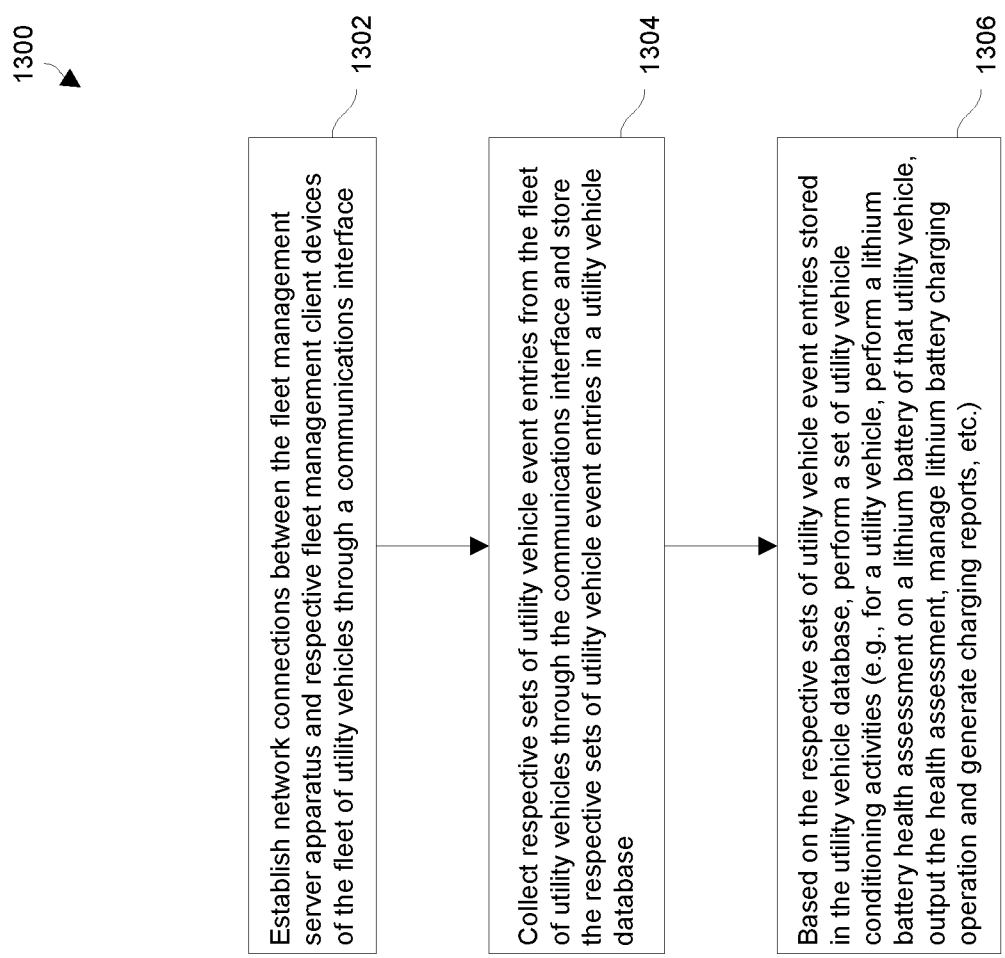
FIG. 16 is a flowchart of a procedure which is performed by a fleet management server apparatus in accordance with some example embodiments.

FIG. 16 shows a procedure 1300 which is performed by the fleet management server apparatus 920 of the fleet management system 900. In some embodiments, the server apparatus 920 remains in operation even after the utility vehicles 20 have gone to sleep or have been turned off.

At 1302, circuitry of the server apparatus 920 establishes network connections between the fleet management server apparatus 920 and the respective fleet management client devices 910 of the fleet of utility vehicles 20 through the communications interface 1200. In some arrangements, as the utility vehicles 20 individually enter the network environment 930 (FIG. 12), the server apparatus 920 and the client device 910 of that utility vehicle 20 communicate with each other (e.g., via WiFi, via a cable that a user connects from a data communications device to the client device 910, etc.).

At 1304, the circuitry of the server apparatus 920 collects respective sets of utility vehicle event entries from the fleet of utility vehicles 20 through the communications interface 1200 and stores the respective sets of utility vehicle event entries in the utility vehicle database 1202. As mentioned earlier, each set of utility vehicle event entries from a utility vehicle 20 identifies a set of utility vehicle events over a period of operation for that utility vehicle 20. In particular, in some embodiments, the set of entries includes a series of lithium battery conditions captured over time such as cell voltage and temperature measurements, captured fault conditions, state transitions such as transitions into or from sleep mode, storage mode, charging mode, and so on. Moreover, other information may be recorded as well such as motor controller status, towing status, and so on.

At 1304, the circuitry of the server apparatus 920 performs, based on the respective sets of utility vehicle event entries stored in the utility vehicle database, a set of utility vehicle conditioning activities. In some embodiments, such activities include, for a utility vehicle 20, performing a lithium battery health assessment on a lithium battery of that utility vehicle, and identifying a current set of health conditions of the lithium battery of that utility vehicle. In accordance with some embodiments, other activities include management of lithium battery charging operation and generation of lithium battery charging reports, and so on.

As described above, improved techniques are directed to charge control that enhances the user experience. Along these lines, a human user is able to initiate pre-charging evaluation of a lithium battery 52 by simply connecting an external charger 300 to a utility vehicle 20. Shortly after the user connects the external charger 300 to the utility vehicle 20 and prior to the utility vehicle 20 providing direction to the external charger 300 to adjust the amount of charge stored by the lithium battery 52, the utility vehicle 20 performs a set of pre-charging assessment operations to determine whether charge adjustment should commence. Upon a successful pre-charging assessment, the utility vehicle 20 automatically provides a user notification indicating that the utility vehicle 20 is properly setup for charge adjustment. Such notification may be in the form of one or more audio signals (e.g., one or more buzzes, beeps, bell tones, other distinctive noises, combinations thereof, etc.) and/or one or more video signals (e.g., one or more solid or blinking lights, output on one or more segmented displays, output on a graphical screen or monitor, combinations thereof, etc.). Additionally, such notification may be through one or more devices of the utility vehicle, through the external charger, through one or more separate devices (e.g., a smart phone, a tablet, a computerized workstation, a server, etc.), or combinations thereof, and so on. For example, circuitry of the utility vehicle 20 may output a "success" signal which causes one or more user output devices selected by the user to provide the notification.

Accordingly, the user is able to proceed elsewhere (e.g., perform other useful work, etc.) with confidence that subsequent charge adjustment will proceed properly. Such operation thus eliminates the need for the user to double check or closely inspect charger connection, etc. Rather, the user may simply connect the charger, receive the notification shortly thereafter, and then proceed to another task (e.g., connect another charger to another vehicle), and so on. In some fleet management arrangements, a fleet of utility vehicles is managed concurrently to further inform the user (or a team of users) as to which utility vehicles of the fleet possess acceptable/unacceptable lithium battery health conditions, etc. before, during and/or after charge evaluation and/or adjustment.

While various embodiments of the present disclosure have been particularly shown and described, it will be understood by those skilled in the art that various changes in form and details may be made therein without departing from the spirit and scope of the present disclosure as defined by the appended claims.

Figure 17:
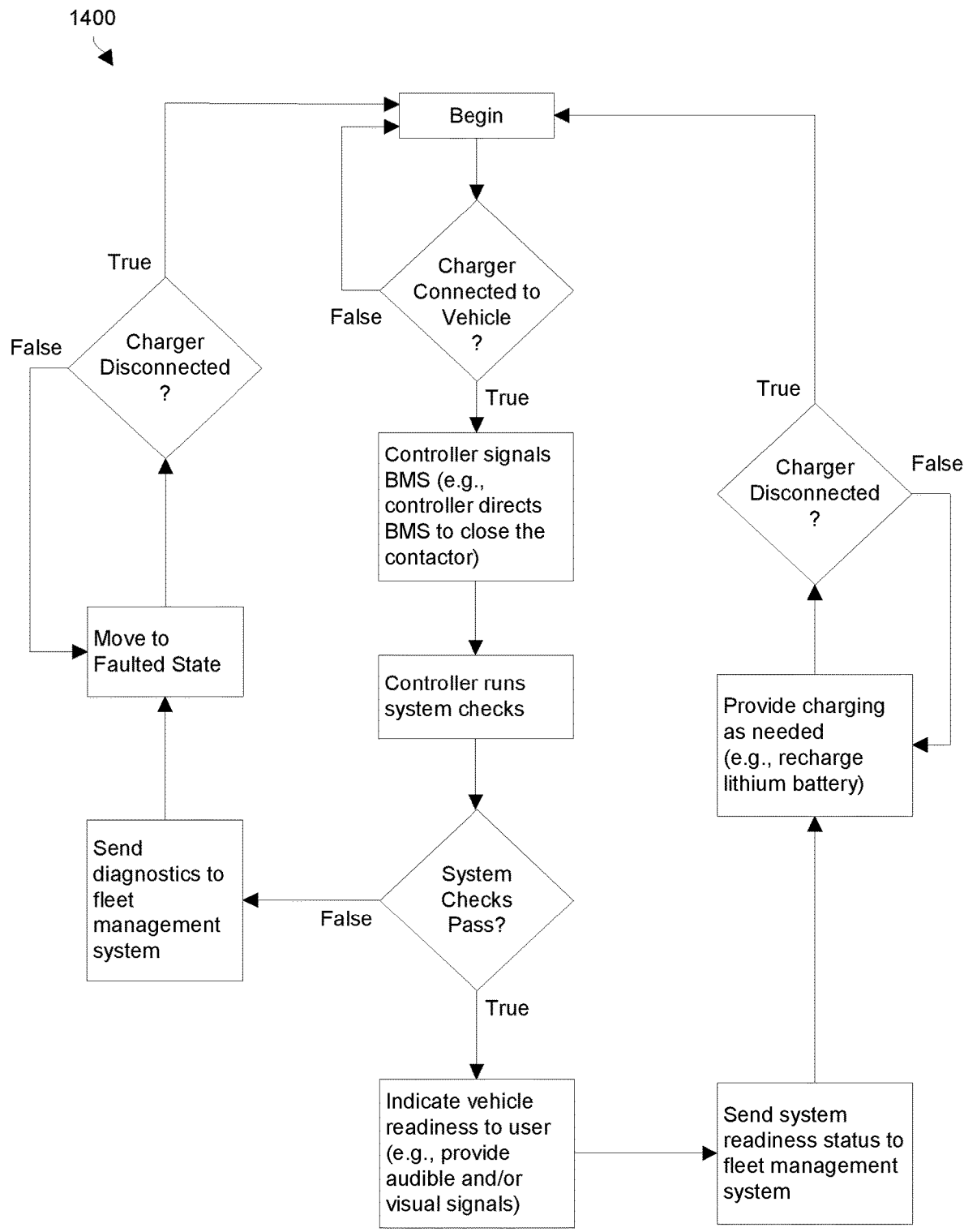
FIG. 17 is a flowchart of a procedure for optimizing lithium battery charge integrity on a utility vehicle in accordance with some example embodiments.

For example, FIG. 17 shows a flowchart of a procedure 1400 for maximizing charge integrity of a lithium battery 52 of a utility vehicle 20 in accordance with certain embodiments. Such a procedure 1400 is capable of being performed for each utility vehicle 20 of a utility vehicle fleet.

In some embodiments, electric vehicle charging is accomplished by a connection between the charger and the electric vehicle. This connection can be in the form of a physical charger plug inserted into a vehicle charging connector. Upon making this connection, a battery charger is able to provide power to the electric vehicle for charging the vehicle's battery pack. In more advanced electric vehicles, the battery charging is managed by a battery management system (BMS). Indication that battery charging has begun is accomplished typically by visual indicators on either or both the battery charger and the electric vehicle.

In some embodiments, the improvement is composed of two parts. These parts are (1) a battery management system parameter check that will verify the entire system is fully prepared to accept charging current and (2) charge integrity displays available through fleet management equipment.

The battery management system check is responsive to connecting the charger in some embodiments. Along these lines, the vehicle traction controller (or motor control system) is powered from the charger and communicates with the Battery Management System to verify charge current can be accepted and activate an audible alarm to signal a user that the check has passed.

Conventional methods that involve charging of lead acid batteries have no Battery Management System available and therefore have little to no intelligence or vehicle integration. Rather, the convention methods require charging to actually begin and be confirmed by means of a measurement of increasing voltage of the battery pack. This type of conventional method is not useful for a vehicle with a Battery Management System as it does not have the ability to check battery conditions before the contactor is closed.

In contrast, the integration of the vehicle systems with a fleet management system introduces opportunity for several features which will help fleet operators understand and improve their vehicle availability in real time. A fleet management system is able to display charging conditions such as state of charge, estimated time to charge completion, charge rate, charging stage and charging related faults.

Additionally, the improved techniques are applicable to any utility vehicle which features a Battery Management System that is integrated with the Vehicle Traction Controller and has an audible alarm and fleet management integration.

Furthermore, it should be understood that portions of the fleet management client device 910 may be combined or share portions of the motor control system 26. Along these lines, processing circuitry that forms some of the control logic for one portion (e.g., processing circuitry of the client device 910) may also form the control logic of another portion (e.g., processing circuitry of the BMS 50, of the motor controller 40, combinations thereof, etc.).

Additionally, it should be understood that the user notification may include any number and/or type of audio/visual indicators. Suitable audio signals include tones, noise patterns, voice, etc. Suitable visual indicators include lights (e.g., colored LEDs, dedicated dashboard lights/icons, headlights, parking lights, signal lights, etc.), touchscreen output, computerized displays, and so on. Other types of user I/O indicators are suitable for use as well. Such modifications and enhancements are intended to belong to various embodiments of the disclosure.

What is claimed is:

1. A charge control system, comprising:
   a lithium battery configured to provide lithium battery power to a set of electrical loads;
   a user signaling device; and
   control circuitry coupled with the lithium battery and the user signaling device, the control circuitry being operative to:
   detect availability of charge from an external charger,
   in response to detection of the availability of charge from the external charger and prior to controlling the external charger to adjust the amount of charge stored by the lithium battery, perform a set of pre-charging assessment operations, and
   based on the set of pre-charging assessment operations, provide a user notification via the user signaling device, the user notification indicating whether the lithium battery is properly setup for charge adjustment;
   wherein the control circuitry, when performing the set of pre-charging assessment operations, is operative to:
   test whether any of a plurality of battery management system (BMS) protection fault conditions exist, and
   generate a pre-charging assessment indication based on whether any of the plurality of BMS protection fault conditions exist; and
   wherein the control circuitry, when testing whether any of the plurality of BMS protection fault conditions exist, is operative to:
   read lithium battery temperature and voltage measurements from the lithium battery, and
   compare the lithium battery temperature and voltage measurements to a set of predefined thresholds to determine whether any of the plurality of BMS protection fault conditions exist.

2. A charge control system as in claim 1 wherein the lithium battery, the user signaling device, and the control circuitry are components of a utility vehicle; and
   wherein the control circuitry is further operative to:
   in response to a successful result from the set of pre-charging assessment operations, provide a control signal that adjusts the amount of charge stored by the lithium battery.

3. A charge control system as in claim 2 wherein the control circuitry, when detecting the availability of charge from the external charger, is operative to:
   detect an external charger connection event in which the external charger connects to a connector of the utility vehicle, the external charger connection event indicating the availability of charge from the external charger.

4. A charge control system as in claim 3 wherein the control circuitry, when providing the control signal that adjusts the amount of charge stored by the lithium battery, is operative to:
   output a charger signal to the external charger through the connector, the charger signal causing the external charger to charge the lithium battery through the connector.

5. A charge control system as in claim 4 wherein the control circuitry, when performing the set of pre-charging assessment operations, is operative to:
   test whether the lithium battery is to receive charge from the external charger, and
   generate a pre-charging assessment indication based on whether the lithium battery is to receive charge from the external charger.

6. A charge control system as in claim 5 wherein the control circuitry, when testing whether the lithium battery is to receive charge from the external charger, is operative to:
   ascertain a current amount of charge stored by the lithium battery, and
   compare the current amount of charge to a predefined target charge range to determine whether the lithium battery is to receive charge from the external charger.

7. A charge control system as in claim 4 wherein the control circuitry, when performing the set of pre-charging assessment operations, is operative to:
   test whether the external charger is operative to provide a predefined voltage to charge the lithium battery, and
   generate a pre-charging assessment indication based on whether the external charger is operative to provide the predefined voltage to charge the lithium battery.

8. A charge control system as in claim 7 wherein the control circuitry, when testing whether the external charger is operative to provide the predefined voltage to charge the lithium battery, is operative to:
   measure a current supply voltage provided by the external charger, and
   compare the current supply voltage to a predefined supply voltage threshold to determine whether the external charger is currently operative to provide the predefined voltage to charge the lithium battery.

9. A charge control system as in claim 4 wherein the control circuitry, when performing the set of pre-charging assessment operations, is operative to:
   (i) test whether any of a plurality of battery management system (BMS) protection fault conditions exist,
   (ii) test whether the lithium battery is to receive charge from the external charger,
   (iii) test whether the external charger is operative to provide a predefined voltage to charge the lithium battery, and
   (iv) generate a pre-charging assessment indication based on (a) whether any of the plurality of BMS protection fault conditions exist, (b) whether the lithium battery is to receive charge from the external charger, and (c) whether the external charger is currently operative to provide the predefined voltage to charge the lithium battery.

10. A utility vehicle, comprising:
    a utility vehicle body;
    a set of electrical loads supported by the utility vehicle body; and
    a charge control system supported by the utility vehicle body and coupled with the set of electrical loads, the charge control system including:
      a lithium battery configured to provide lithium battery power to the set of electrical loads,
      a user signaling device, and
      control circuitry coupled with the lithium battery and the user signaling device, the control circuitry being operative to:
        detect availability of charge from an external charger,
        in response to detection of the availability of charge from the external charger and prior to controlling the external charger to adjust the amount of charge stored by the lithium battery, perform a set of pre-charging assessment operations, and
        based on the set of pre-charging assessment operations, provide a user notification via the user signaling device, the user notification indicating whether the lithium battery is properly setup for charge adjustment;
    wherein the control circuitry, when performing the set of pre-charging assessment operations, is operative to:
      test whether any of a plurality of battery management system (BMS) protection fault conditions exist, and
      generate a pre-charging assessment indication based on whether any of the plurality of BMS protection fault conditions exist; and
    wherein the control circuitry, when testing whether any of the plurality of BMS protection fault conditions exist, is operative to:
      read lithium battery temperature and voltage measurements from the lithium battery, and
      compare the lithium battery temperature and voltage measurements to a set of predefined thresholds to determine whether any of the plurality of BMS protection fault conditions exist.

11. A utility vehicle as in claim 10 wherein the lithium battery, the user signaling device, and the control circuitry are components of a utility vehicle; and
    wherein the control circuitry is further operative to:
      in response to a successful result from the set of pre-charging assessment operations, provide a control signal that adjusts the amount of charge stored by the lithium battery.

12. A utility vehicle as in claim 11 wherein the control circuitry, when detecting the availability of charge from the external charger, is operative to:
    detect an external charger connection event in which the external charger connects to a connector of the utility vehicle, the external charger connection event indicating the availability of charge from the external charger.

13. A utility vehicle as in claim 12 wherein the control circuitry, when providing the control signal that adjusts the amount of charge stored by the lithium battery, is operative to:
    output a charger signal to the external charger through the connector, the charger signal causing the external charger to charge the lithium battery through the connector.

14. A utility vehicle as in claim 13 wherein the control circuitry, when performing the set of pre-charging assessment operations, is operative to:
    test whether the lithium battery is to receive charge from the external charger, and
    generate a pre-charging assessment indication based on whether the lithium battery is to receive charge from the external charger.

15. A utility vehicle as in claim 14 wherein the control circuitry, when testing whether the lithium battery is to receive charge from the external charger, is operative to:
    ascertain a current amount of charge stored by the lithium battery, and
    compare the current amount of charge to a predefined target charge range to determine whether the lithium battery is to receive charge from the external charger.

16. A utility vehicle as in claim 13 wherein the control circuitry, when performing the set of pre-charging assessment operations, is operative to:

test whether the external charger is operative to provide a predefined voltage to charge the lithium battery, and generate a pre-charging assessment indication based on whether the external charger is operative to provide the predefined voltage to charge the lithium battery.

17. A utility vehicle as in claim 16 wherein the control circuitry, when testing whether the external charger is operative to provide the predefined voltage to charge the lithium battery, is operative to:

measure a current supply voltage provided by the external charger, and compare the current supply voltage to a predefined supply voltage threshold to determine whether the external charger is currently operative to provide the predefined voltage to charge the lithium battery.

18. A utility vehicle as in claim 13 wherein the control circuitry, when performing the set of pre-charging assessment operations, is operative to:

(i) test whether any of a plurality of battery management system (BMS) protection fault conditions exist, (ii) test whether the lithium battery is to receive charge from the external charger, (iii) test whether the external charger is operative to provide a predefined voltage to charge the lithium battery, and (iv) generate a pre-charging assessment indication based on (a) whether any of the plurality of BMS protection fault conditions exist, (b) whether the lithium battery is to receive charge from the external charger, and (c) whether the external charger is currently operative to provide the predefined voltage to charge the lithium battery.

19. A charge control method, comprising:

detecting availability of charge from an external charger;

in response to detection of the availability of charge from the external charger and prior to controlling the external charger to adjust the amount of charge stored by a lithium battery, performing a set of pre-charging assessment operations; and based on the set of pre-charging assessment operations, providing a user notification via a user signaling device, the user notification indicating whether the lithium battery is properly setup for charge adjustment;

wherein performing the set of pre-charging assessment operations includes:

testing whether any of a plurality of battery management system (BMS) protection fault conditions exist, and generating a pre-charging assessment indication based on whether any of the plurality of BMS protection fault conditions exist; and wherein testing whether any of the plurality of BMS protection fault conditions exist includes:

reading lithium battery temperature and voltage measurements from the lithium battery, and comparing the lithium battery temperature and voltage measurements to a set of predefined thresholds to determine whether any of the plurality of BMS protection fault conditions exist.

20. A charge control method as in claim 19 wherein reading the lithium battery temperature and voltage measurements from the lithium battery includes:

obtaining the lithium battery temperature and voltage measurements from the lithium battery while the lithium battery resides on a utility vehicle.

* * * * *